United States Patent [19]
Cahn et al.

[11] Patent Number: 5,535,278
[45] Date of Patent: Jul. 9, 1996

[54] GLOBAL POSITIONING SYSTEM (GPS) RECEIVER FOR RECOVERY AND TRACKING OF SIGNALS MODULATED WITH P-CODE

[75] Inventors: Charles R. Cahn, Manhattan Beach; Richard G. Keegan, Torrance; Jerry E. Knight, Long Beach; Thomas A. Stansell, Jr., Rancho Palos Verdes, all of Calif.

[73] Assignee: Magnavox Electronic Systems Company, Fort Wayne, Ind.

[21] Appl. No.: 236,291

[22] Filed: May 2, 1994

[51] Int. Cl.[6] ................................................ H04L 9/00
[52] U.S. Cl. ................................................ 380/49; 342/357
[58] Field of Search ................................. 342/357; 375/1; 380/49

[56] References Cited

U.S. PATENT DOCUMENTS

| | | | |
|---|---|---|---|
| 4,463,357 | 7/1984 | MacDoran | 343/460 |
| 4,701,934 | 10/1987 | Jasper | 375/1 |
| 4,797,677 | 1/1989 | MacDoran | 342/352 |
| 4,963,889 | 10/1990 | Hatch | 342/357 |
| 4,972,431 | 11/1990 | Keegan | 375/1 |
| 5,072,227 | 12/1991 | Hatch | 342/357 |
| 5,134,407 | 7/1992 | Lorenz et al. | 342/357 |
| 5,177,489 | 1/1993 | Hatch | 342/357 |
| 5,323,322 | 6/1994 | Mueller et al. | 342/357 |

*Primary Examiner*—Salvatore Cangialosi
*Attorney, Agent, or Firm*—Noel Heal; Richard T. Seeger

[57] ABSTRACT

Method and apparatus for improving the speed and accuracy of processing signals from global positioning system (GPS) receivers by ensuring access to GPS carrier signals that have been modulated with an encrypted P-code sequence. In one disclosed embodiment of the invention, GPS L1 and L2 signals are correlated with a locally generated P-code signal, bandpass filtered to enhance signal-to-noise ratio performance, and then cross-correlated to obtain a signal with an L1–L2 frequency component that facilitates the resolution of carrier cycle ambiguity. In another embodiment, received GPS signals are immediately converted to digital form, then digitally correlated with in-phase and quadrature components of a locally generated P-code signal. Signals resulting from the correlation are then integrated over timing intervals corresponding to a previously determined encryption period to provide in-phase (I) and quadrature (Q) samples. In one variant of this embodiment, the I and Q samples derived from the L2 GPS signal are digitally squared to obtain an L2 carrier. In another variant, I and Q samples derived from both L1 and L2 signals are cross-correlated to obtain a digital carrier with an L1–L2 component. Tracking errors for the L1 and L2 P-code signals are computed using a similar digital technique.

29 Claims, 18 Drawing Sheets

GLOBAL POSITIONING SYSTEM (GPS) RECEIVER FOR RECOVERY AND TRACKING OF SIGNALS MODULATED WITH P-CODE

BACKGROUND OF THE INVENTION

This invention relates generally to global positioning systems (GPS) and, more particularly, to techniques for improving the speed and accuracy of signal processing by GPS receivers. The invention is in part related to the subject matter of U.S. Pat. No. 4,972,431, issued in the name of Richard G. Keegan, entitled "P-Code-Aided Global Positioning System Receiver." Much of the background material provided in that patent is also pertinent to the present invention and is repeated here for convenience. U.S. Pat. No. 4,972,431 is hereby incorporated by reference into this specification.

In the terminology of GPS (Global Positioning System), the invention relates to techniques for obtaining P-code and phase measurements of the suppressed carrier signals known as L1 and L2, in spite of "anti-spoofing" encryption of the P-code signals that modulate L1 and L2. As will be described, "code" measurements are measurements of the apparent distances or "pseudoranges" of satellites with respect to a receiver, as determined from event times of the codes or signals used to modulate L1 and L2.

There is an important advantage to obtaining access to the L1 or L2 carrier signal, or to both L1 and L2 carriers. Measurement of carrier phase provides a higher level of relative or differential position-finding accuracy than is available from code measurements alone. Although this can be accomplished with the L1 carrier signal alone, access to L2 permits much faster resolution of carrier cycle ambiguities and also enables phase correction of the ionospheric refraction error.

GPS, also called NAVSTAR, is a system for determining the position of a user on or near the earth, from signals received from multiple orbiting satellites. When the system is fully deployed, the satellites will be arranged in multiple orbit planes, such that signals can be received from at least four satellites at any point on or near the earth with an unobstructed view of the sky.

The orbits of the spacecraft are determined with accuracy from fixed ground stations and are relayed back to the spacecraft. In navigation applications of GPS, the latitude, longitude and altitude of any point close to the earth can be calculated from the times of propagation of electromagnetic energy from four or more of the spacecraft to the point on or near the earth. In general, at least four satellite signals need to be received at a ground station in order to determine the complete position, since there are four unknown quantities. Three of the unknowns are the three-dimensional position coordinates, which may be conveniently expressed in terms of latitude, longitude and altitude, and the fourth unknown quantity is a time difference or offset between timing clocks on the satellites and a timing clock at the receiver.

The nature of the signals transmitted from GPS satellites is well known from the literature, and will be described in more detail in the description of the preferred embodiment of the invention. In brief, each satellite transmits two spread-spectrum signals in the L band, known as L1 and L2, with separate carrier frequencies. Two signals are needed to eliminate an error that arises due to the refraction of the transmitted signals by the ionosphere. The satellite signals are modulated by two pseudorandom codes, one referred to as the C/A (coarse/acquisition) code, and the other referred to as the P (precise) code, and by a slower-varying data signal defining the satellite orbits and other system information. A pseudorandom code sequence is a series of numbers that are random in the sense that each one bears no discernible relation to the ones that precede it, but are not truly random, because the sequence is deterministic and repeats itself cyclically.

When a binary pseudorandom code is used to biphase-modulate the phase of a carrier signal, the result is a signal having a spectral density that follows a $[(\sin x)/x]^2$ distribution, where x is proportional to frequency offset from the carrier frequency. This "spread spectrum" signal has the advantage of being more immune to jamming or interference than a narrowband signal. A signal modulated by a pseudorandom code has the useful property that, when the signal is properly correlated with a replica of the same pseudorandom code, most of the spread spectrum energy is mapped into a narrow peak in the frequency spectrum, but only if the two correlated signals are properly synchronized in time. This property can be used to identify and separate signals from multiple satellites, by correlating a received signal with multiple locally generated pseudorandom code sequences. Each GPS satellite uses unique P code and C/A code sequences, which are publicly known. Therefore, a particular satellite is identifiable by the correlation of a received signal with a locally generated code sequence corresponding to that satellite. Once a received signal is identified and decoded, the receiver can measure an apparent transmission time from the satellite, from which an apparent range, or pseudo-range, is computed. Signals transmitted from each satellite define the time and position of the satellite at certain signal epochs whose times of reception can be measured at the receiver. The transmit times are all measured with reference to a common time base referred to as GPS system time. Each receiver uses its own local time reference for recording the receive times of signals from the satellites. Thus, each receiver has knowledge of the transmit times measured in GPS system time and the receive times measured in local time. If there is at least one more satellite signal than there are positional unknown quantities, the time differential between the local time and satellite time can be determined along with the positional unknown quantities. For example, four satellite signals are needed to find three positional unknowns and the time differential. From the pseudo-range data, the position of the receiver on or near the earth can be computed to a high degree of accuracy, depending on the accuracy of the orbit data.

For most civil navigation applications, such as for navigation at sea, only the C/A code is needed and errors due to ionospheric refraction can be ignored. Such a receiver performs its computations based on an analysis of the C/A code signal modulated onto the L1 carrier frequency. However, for more precise differential or survey applications, use of the P code modulated onto the L1 and L2 carriers, as well as the C/A code modulated onto the L1 carrier, provides a more precise determination of relative position because the availability of signals at two different carrier frequencies allows compensation for ionospheric refraction errors, which have a well known frequency dependence.

Survey applications differ from purely navigational applications of GPS in two principal respects. First, survey work requires a higher level of accuracy than most navigational applications. Fortunately, this higher accuracy can be obtained because of a second distinction between the two types of applications, which is that survey work for the most part involves measurements of the position of one point with respect to another, rather than the absolute determination of position. In most survey work, a benchmark or reference position is known to a high degree of accuracy, and the relative positions of other points are determined with respect to the benchmark. A line between the benchmark and another point is sometimes referred to as a baseline.

The high accuracy demanded by survey applications of GPS can best be obtained by recovering at least one of the satellite carrier signals, L1 or L2, at two receivers positioned at the ends of the baseline, and measuring the phase of the carrier at synchronized time points at the two positions. The L1 carrier signal has a wavelength of approximately 19 centimeters (cm). If its phase can be determined to an accuracy of less than approximately ten degrees, distance measurements can be made to an accuracy of better than five millimeters.

One difficulty in making distance measurements based on carrier phase detection is that of resolving ambiguities in the carrier signal phase. Once a receiver has acquired or locked onto an incoming carrier signal, each successive cycle of the carrier is identical, and the receiver may be unable to determine which cycle is being received at any instant in time. The actual approach used by survey instruments to resolve this carrier cycle ambiguity is to solve for the position of the instrument to an accuracy level of one carrier cycle, i.e. to an accuracy of ±9.5 cm. Two possible ways of determining the position to this level of accuracy are either to use a sufficient number of pseudo-range measurements or to use integrated Doppler measurements with sufficient geometry between endpoints. The first method uses a large number of pseudo-range (or code) measurements to average out the noise in each individual measurement. This may be viable for P-code measurements since each P code chip is only 30 meters long and the thermal noise of each sample causes an error of only a few meters (neglecting signal multipath effects). However, with C/A code measurements the approach is less viable, since the chip length is 300 meters and the error due to noise is similarly larger (with multipath effects also being more pronounced). The second approach to position determination based on carrier phase measurements is similar to hyperbolic navigation measurements used in other systems, such as Loran-C and Transit. This method develops several (one for each satellite begin tracked) hyperbolic lines-of-position defined by a range difference between two positions of the same satellite as it traverses its orbit. The range difference is determined by the integrated carrier phase (integrated Doppler) measurements of the received signal between the two endpoints defined by the two satellite positions. The accuracy of the measurement is largely determined by the separation of the endpoints (the geometry of the measurement), and the accuracy required from each measurement is largely determined by the relative geometries between the satellites. In any event, by use of one of these techniques, the phase ambiguity of the received carrier signal is resolved, i.e., it is possible to determine which cycle is being received, and phase measurements within one cycle then permit very precise measurements to be made.

The difficulty with this approach is that it may take an inconveniently long time to accumulate enough measurement samples to eliminate the carrier cycle ambiguities. A faster technique uses the difference frequency L1–L2 to reduce the measurement accuracy needed to resolve carrier cycle ambiguities. The difference or beat frequency L1–L2 has a frequency of approximately 350 MHz and a wavelength of approximately 86 cm. Therefore, there are about 4.5 cycles of the L1 carrier for one cycle of the difference frequency. In essence, then, each receiver need only accumulate enough samples to determine position to within 86 cm., as compared with 19 cm., in order to resolve the carrier cycle ambiguities. This is one of two reasons why access to the L2 GPS signal is highly important for survey applications. With access to L1 only, a large number of samples must be accumulated at each receiver in order to resolve carrier cycle ambiguities during post-processing.

The other reason that access to L2 is important is to compensate for ionospheric effects on the GPS signals. Since different frequencies are refracted differently by the ionosphere, the effect of ionospheric refraction on a GPS signal can be determined with good accuracy by observing the phase changes between the two signals. The L1 and L2 signals are coherent when transmitted (i.e. derived from the same oscillator). The relative phase of the two carriers upon reception provides a measure of the ionospheric refraction effect, and the phase of L1 can be compensated accordingly. When measuring short baselines, ionospheric compensation is of little value, since the transmission paths to both receivers are practically identical. However, for longer baseline measurements, the signals received take substantially different paths through the ionosphere, and compensation is needed for accurate results.

In an effort to ensure that the P code cannot be generated by bogus transmitters attempting to "spoof" the system, the United States Government, which operates the GPS system, has implemented an "anti-spoofing" measure. The P code will be encrypted by complementing certain of the P-code bits in some manner, during at least part of the time that the system is in operation. The government can turn the encryption on or off as desired. For the system to be used as intended, received encrypted P-code signals must be correlated with a locally generated encrypted P-code sequence. Without knowledge of the encryption process or access to an encryption key, the measurement of pseudo-ranges from the encrypted P-code using currently available receiver technology is a practical impossibility.

As mentioned earlier, the GPS signals are intended to be recovered by correlating each incoming signal with a locally generated replica of the code: P-code or C/A code. The carrier in the GPS signals is totally suppressed when the modulating signal is a pseudorandom code sequence like the P code or the C/A code. In other words, the received L1 or L2 signal contains no component at the L1 or L2 frequency. Yet it is important for survey applications to be able to reconstruct the L1 and L2 carriers and to measure their phases. So long as the P-code is not encrypted, the L1 or L2 carrier is easily recovered by correlation of the received signal with the locally generated P code replica (or C/A code for L1). The locally generated code is adjusted in timing to provide an optimum correlation with the incoming signal. The correlation output is then a single narrowband peak centered at the carrier frequency. That is to say, recovery of the carrier is the natural result of the correlation process used to identify and separate incoming GPS signals. Moreover, the carrier recovered by correlation provides the best available signal-to-noise ratio.

Although the L1 or L2 carrier cannot be recovered by the P-code correlation process when the P code is encrypted, the second harmonic of the carrier phase can be recovered by squaring the incoming signal; that is, multiplying the signal by itself. As is well known, this has the effect of removing all biphase modulation from the signal and producing a single-frequency output signal at twice the frequency of the suppressed carrier. Systems using this technique often recover the L1 carrier phase with the C/A code and the L2 carrier signal by squaring, regardless of whether or not the modulating P code is encrypted. Two serious drawbacks to this procedure are that, first, squaring the signal also squares its noise component and, second, squaring effectively halves the wavelength and causes half-cycle ambiguity. The resulting signal-to-noise ratio for the recovered carrier signal is significantly degraded by the squaring process, e.g., by 30 dB (decibels) or more compared with the ratio for the carrier recovered by correlation.

The aforementioned Keegan patent (U.S. Pat. No. 4,972, 431) is directed to an improved squaring technique for recovering the L1 or L2 carrier and obtaining P-code pseudo-range measurements from signals received from GPS satellites, even when the P-code signals are encrypted. A received signal is correlated with a locally generated replica of the P-code sequence and then bandpass filtered before squaring the resulting signal. Bandpass filtering before squaring significantly improves the signal-to-noise ratio, as compared with simply squaring across a large bandwidth.

Another known technique for improving GPS receiver performance is to cross-correlate received L1 and L2 signals in order to derive an equivalent carrier signal at the L1–L2 frequency. This is possible because L1 and L2 are modulated with the same P-code. Cross-correlation has a significant advantage over squaring techniques, in that the full 86 cm wavelength is obtained instead of half that value with squaring techniques. As discussed above, the wavelength of the L1 carrier signal is approximately 19 centimeters, and the elimination of carrier cycle ambiguity requires that the GPS receiver position be determined to an accuracy of ±9.5 cm. If a squaring technique is used to recover the encrypted L2 signal, the result is a double frequency component (2L2) with a wavelength of 12.2 cm. The best, i.e. largest, carrier cycle ambiguity that can be obtained using a squaring technique using frequency 2L1–2L2 is given by the wavelength of approximately 43 cm, and the required positional accuracy is approximately ±21.5 cm. However, if the L1 and L2 signals are cross-correlated, the resulting signal is of frequency L1–L2, with a carrier cycle ambiguity of approximately 86 cm and a required positional accuracy of approximately ±43 cm.

There are two significant drawbacks involved with cross-correlating the L1 and L2 signals. One is that the technique still has the low signal-to-noise characteristics associated with a conventional squaring approach. The other is that the L1 and L2 signals will not, in general, be coherent because of ionospheric effects. The L2 signal will be delayed in the ionosphere, to a varying degree, as compared with the L1 signal. Because the delay may exceed the P-code chip duration, some form of time compensation is required before the two received signals can be correlated.

The present invention provides solutions to these difficulties and has additional advantages over the prior art.

SUMMARY OF THE INVENTION

The present invention resides in a method and apparatus for improving the speed and accuracy of signal processing by GPS receivers when GPS signals are modulated with an encrypted P-code sequence. The techniques of the invention provide access to a carrier signal, or to a carrier difference signal, in spite of encryption of the P-code sequence. It will be understood that the terms "GPS" and "global positioning system" as used in this specification and the appended claims are not intended to be limited to the system administered by the United States Government and they also may encompass the Russian GLONASS satellite system and any similar systems that may be developed.

In each embodiment of the invention, the effect of P-code encryption is eliminated by either squaring one of the received carrier signals or by cross-correlating the two received carrier signals. Whole-cycle ambiguity of carrier phase measurements is resolved more efficiently if a signal proportional to L1–L2 is derived, as by cross-correlation. In those embodiments in which a received signal is squared, there is half-cycle ambiguity with respect to the phase of the original carrier (before squaring), and means must be provided for resolving this ambiguity. In two of the disclosed embodiments, half-cycle ambiguity is resolved by cross-correlation to provide an L1–L2 signal from which a polarity signal is derived. In one of these embodiments, there is direct cross-correlation of L1 and L2, and the relative timing of L1 and L2 are first adjusted to compensate for ionospheric effects, using timing information derived from separated P-code tracking loops for L1 and L2. In the other of these two embodiments, the cross-correlation is P-code-aided, i.e., the L1 and L2 signals supplied to the cross-correlator are derived from separate code-aided tracking loops. (A detailed description of P-code aiding is provided in the description of the preferred embodiments.) There are other aspects and embodiments of the invention, all of which are also discussed in the more detailed description that follows this summary.

In one embodiment of the invention, received GPS L1 and L2 signals with encrypted P-code are first each correlated with a locally generated (nonencrypted) P-code, and the results of the correlations are bandpass filtered to improve signal-to-noise performance, in much the same way that performance is improved in the technique of the earlier-referenced patent to Keegan (U.S. Pat. No. 4,972,431). In this embodiment, however, both L1 and L2 signals are separately correlated with the locally generated P-code and each is separately bandpass filtered. Then the filtered signals are cross-correlated to derive a carrier difference signal (L1–L2), the use of which provides improved performance in terms of ability to resolve carrier cycle ambiguity.

The specific steps of this embodiment include receiving L1 and L2 signals transmitted from each of a plurality of satellites, the signals containing an encrypted version of a pseudorandom code sequence known as P code; independently generating a replica of the P-code pseudorandom code sequence without encryption; correlating each of the received L1 and L2 signals containing the encrypted P-code sequence with the locally generated replica of the P-code sequence to obtain two resultant signals having frequency spectra containing a peak whose amplitude is indicative of the timing relationship between the received encrypted P-code sequence and the locally generated P-code sequence; bandpass filtering each of the resultant signals from the correlating step; and cross-correlating the resultant signals after bandpass filtering to obtain a carrier signal at frequency (L1–L2) with a favorable signal-to-noise ratio. The method will further include controlling the step of generating the replicas of the P-code sequence to maximize the peaks in the frequency spectra.

In another embodiment of the invention, received GPS signals are first converted to in-phase and quadrature components, which are correlated with a locally generated P-code signal. The digital values resulting from these correlations are then integrated over timing intervals corresponding to a previously determined encryption period of the encrypted P-code sequence to provide output samples of in-phase (I) and quadrature (Q) values at a rate corresponding to the encryption period.

In one variant of this embodiment, these I and Q samples are derived from the received signal and are then digitally complex squared to obtain squared I and Q values that correspond to a double-frequency component in which the effects of P-code encryption are not present. The double-frequency carrier component can then be used to control P-code generation and derive P-code pseudorange measurements for the purpose of determining the GPS receiver position.

In another variant of the digital embodiment, I and Q samples digitally correlated with the respective P-codes are derived from both L1 and L2 received GPS signals by the process described above and are then digitally cross-correlated to produce I and Q values having a carrier difference component at frequency L1–L2. The L1–L2 signal facilitates resolution of carrier cycle ambiguity. A significant advantage of the digital technique for cross-correlation is that compensation of the received signals for ionospheric refraction is not required because the ionospheric delay is small compared with the encryption time interval used to control integration and sampling of the I and Q signals.

More specifically, the method steps in the digital squaring technique of the invention include receiving a signal transmitted from each of a plurality of satellites, the signal containing an encrypted version of a pseudorandom code sequence known as P code; converting the received signals to digital form; independently generating a digital replica of the P-code pseudorandom code sequence without encryption, this locally generated digital P-code having in-phase and quadrature components; digitally correlating the received encrypted P-code sequence in digital form with the in-phase (I) and quadrature (Q) components of the locally generated replica of the P-code sequence to obtain a succession of I and Q samples of correlated encrypted received P-code and non-encrypted locally generated P-code signals; integrating the I and Q samples over a time period previously determined to be the encryption time period to obtain successive I and Q values; and digitally squaring I and Q values obtained from the integrating step to obtain squared I and Q values that are independent of encryption.

The method steps involved in the digital form of the invention that cross-correlates the I and Q samples derived from the received L1 and L2 signals includes receiving L1 and L2 signals transmitted from each of a plurality of satellites, the signals containing an encrypted version of a pseudorandom code sequence known as P code; converting the received signals to digital form; independently, and locally, generating a digital replica of the P-code pseudorandom code sequence without encryption, this locally generated P-code having in-phase (I) and quadrature (Q) components; digitally correlating each of the received L1 and L2 signals containing the encrypted P-code sequence with the locally generated digital replica of the P-code sequence to obtain two resultant I and Q signals relating to L1 and two other resultant I and Q signals relating to L2; separately integrating the two pairs of resultant signals over the previously determined encryption time interval to obtain $I_1$ and $Q_1$ signals corresponding to the received L1 signals and $I_2$ and $Q_2$ signals corresponding to the received L2 signals; and digitally cross-correlating the resultant $[I_1+jQ_1]$ and $[I_2+jQ_2]$ signals to obtain a carrier signal at frequency (L1–L2) with a favorable signal-to-noise ratio.

A similar digital technique is used in accordance with another aspect of the invention to compute a P-code tracking error for both L1 and L2 received GPS signals. Specifically, the received signals (L1 or L2) are converted to digital form and correlated with P-code early-late signals that are locally generated. The results of the correlations are integrated over the encryption time period and then used to compute a P-code tracking error. The tracking error is computed from the vector dot product of the I and Q early-late signal samples and the I and Q samples derived from correlating the received signals with a locally generated P-code sequence. The P-code tracking error thus computed is used in conjunction with a conventional delay-lock tracking loop to control generation of the P-code sequence and the P-code early-late signals.

Yet another embodiment of the invention may be defined in terms of a method for processing received signals in a global positioning system (GPS), to generate a carrier difference signal having a frequency that is the difference between L1 and L2 GPS carrier signals that have been modulated with an encrypted P-code signal. The method comprises the steps of: receiving L1 and L2 signals transmitted from each of a plurality of satellites, the signals containing an encrypted version of a pseudorandom code sequence known as P code; converting the received signals to digital form; independently generating for L1 and L2 separate digital replicas of the P-code pseudorandom code sequence without encryption, having in-phase (I) and quadrature (Q) components; generating a replica of the C/A code sequence; correlating the replica of the C/A code sequence with the received L1 signal, to permit carrier tracking of the L1 signal; correlating the replicas of the P-code sequence with the received L1 and L2 signals, respectively, to provide code tracking of the L1 and L2 signals; digitally cross-correlating I1/Q1 and I2/Q2 signals obtained from correlation with the replicas of the P-code sequences, to obtain a carrier signal at frequency (L1–L2) with a favorable signal-to-noise ratio; and carrier tracking the L2 signal by combining the (L1–L2) carrier signal obtained from the cross-correlation step and the L1 carrier signal obtained from L1 carrier tracking.

The invention may also be defined as a method for processing received signals in a global positioning system to take advantage of a processing speed benefit that arises from use of a carrier difference signal having frequency that is equivalent to the difference between two carrier signals L1 and L2 that have been modulated with an encrypted P-code signal. This method comprises the steps of: locally generating two separate P-code replicas; employing the P-code replicas to aid in code tracking of the L1 and L2 signals in separate tracking loops; locally generating a C/A code replica; employing the C/A code replica to track the L1 carrier signal; squaring the L2 carrier signal to eliminate the effect of an encrypted P-code signal and to obtain a signal of frequency 2L2, wherein the phase of the L2 signal, derived by dividing the 2L2 phase by two (2L2/2); cross-correlating the L1 and L2 carrier signals to obtain an L1–L2 difference signal; deriving from the L1–L2 difference signal a polarity signal from which half-cycle ambiguity of the phase measurement of L2, as derived from the phase of 2L2/2, can be resolved.

More specifically, in the method described in the foregoing paragraph the cross-correlation step is one of direct cross-correlation of the L1 and L2 carrier signals; and the method further comprises the steps of adjusting the phase of L1 relative to L2, prior to cross-correlation of L1 and L2, using timing information derived from the separate code tracking loops for L1 and L2. In one illustrative embodiment of the invention, the step of adjusting the phase of L1 relative to L2 is effected by shifting one of the L1 and L2 carrier signals through a multi-stage shift register to provide a variable delay, and controlling the amount of the delay with timing signals from the separate tracking loops.

In yet another embodiment of the invention, the cross-correlation step is one of code-aided cross-correlation, wherein L1 and L2 signals for cross-correlation are derived from the separate code tracking loops for L1 and L2.

It will be appreciated from the foregoing that the present invention represents a significant advance in the field of GPS receivers. In particular, the invention provides for enhanced accuracy and speed of signal processing by GPS receivers when GPS carrier signals are modulated with an encrypted P-code sequence. As in the earlier referenced Keegan patent, this enhanced performance in the presence of encryption does not detract from the "anti-spoofing" function of P-code encryption.

Other aspects and advantages of the invention will become apparent from the following more detailed description, taken in conjunction with the accompanying drawings.

DESCRIPTION OF THE PREFERRED EMBODIMENTS

Introduction

The present invention is concerned with improvements in a global positioning system (GPS) receiver, and more specifically with a GPS receiver for use in survey and high-precision navigation (kinematic) applications in which access to both L1 and L2 carrier signals is needed to improve the speed and accuracy of baseline measurements. Access to both carrier signals allows corrections to be made to compensate for ionospheric refraction of the GPS signals and facilitates rapid resolution of phase ambiguities in the survey (kinematic) solution.

Figure 1:
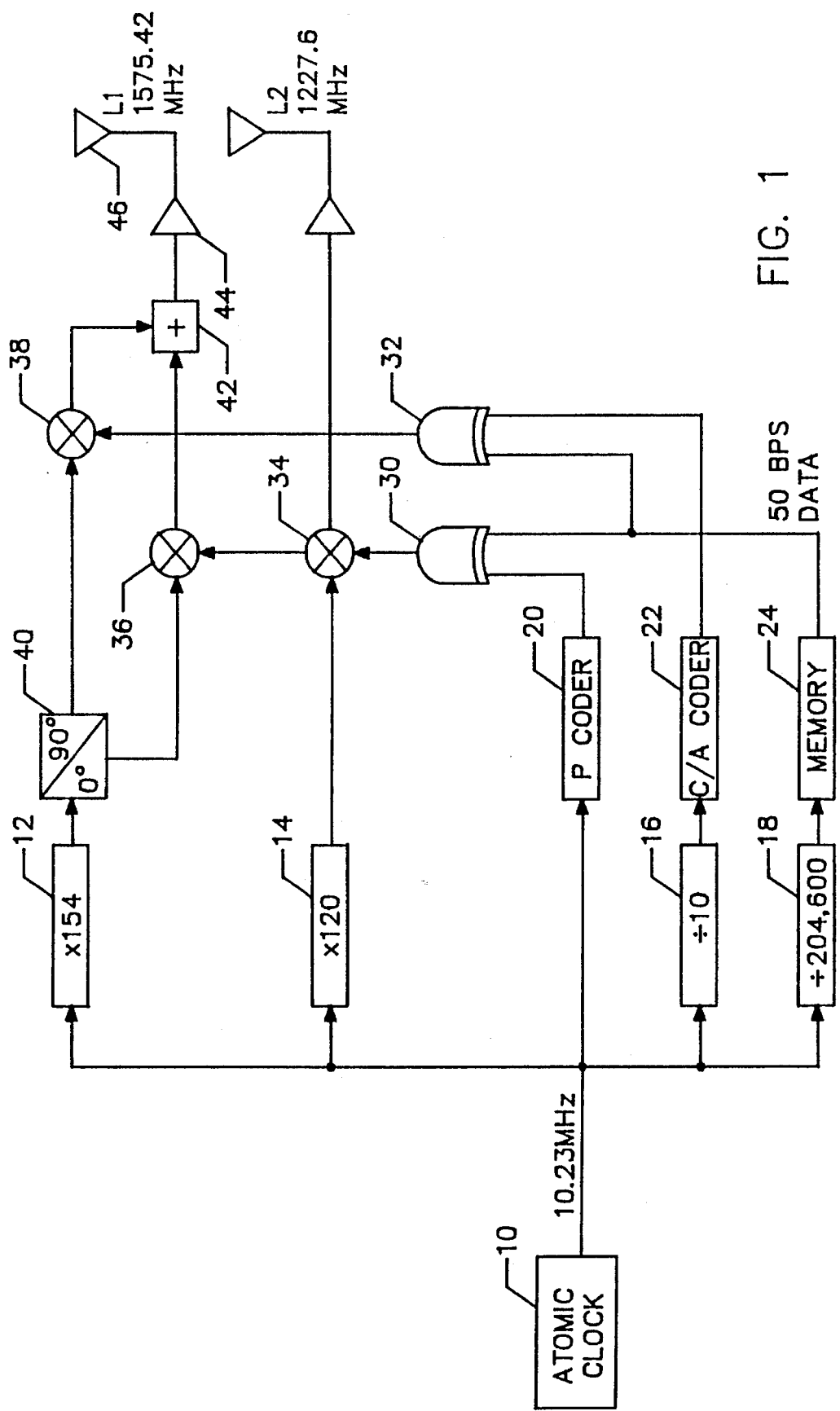
FIG. 1 is a simplified block diagram of signal transmission apparatus included in a GPS satellite.

By way of further background, FIG. 1 shows how two L-band GPS signals are synthesized for transmission from one of a plurality of GPS satellites. The transmitter on each satellite includes an atomic clock, indicated by reference numeral 10, and four frequency multipliers or dividers, 12, 14, 16 and 18. The clock frequency is 10.23 megahertz (MHz), and is multiplied by a factor of 154 in frequency multiplier 12, to provide a carrier frequency of 1575.42 MHz for a first L-band transmission, designated the L1 signal, and is multiplied by a factor of 120 in frequency multiplier 14 to provide a carrier frequency of 1227.6 MHz for a second L-band transmission, designated the L2 signal. The transmitter also includes a P-coder 20 for generation of a pseudorandom code known as the P code (for precise code) and a C/A coder 22 for generation of another pseudorandom code known as the C/A code (for coarse/acquisition code).

The P code is a two-level or binary code that changes state at a 10.23 MHz rate derived directly from the clock 10. Each bit or "chip" of the code is approximately 30 meters long as transmitted through space, and the duration of the code is one week. In other words, each full cycle of the code sequence is one week long. The C/A code changes state at a frequency only one-tenth that of the P code, i.e., at a rate of 1.023 MHz, derived from the clock 10 through frequency divider 16. The C/A code has a duration of 1,023 chips, which means that the code repeats after 1,023 code elements. Each full cycle of the C/A code takes one millisecond (1 ms), and each C/A code chip is approximately 300 meters in length as transmitted.

The remaining frequency divider 18 in the transmitter has a dividing factor of 204,600 to produce a clock rate of 50 hertz for addressing a memory 24 which contains data to be transmitted with the L1 and L2 signals. Outputs from the P-coder 20 and the memory 24 are connected as inputs to an exclusive OR (XOR) gate 30, and outputs from the C/A coder 22 and the memory 24 are connected as inputs to another exclusive OR (XOR) gate 32. Output from the first XOR gate 30 is connected to two mixers 34 and 36, and output from the second XOR gate 32 is connected to a third mixer 38. Functional block 40 is intended to indicate that the 1575.42 MHz L1 carrier signal is split into two quadrature components, which are next separately modulated by mixers 34 and 38 and then recombined in a signal combiner 42 before amplification in amplifier 44 and transmission from an antenna 46.

It will be seen that the L1 signal is derived from a 1575.42 MHz carrier, a P-code signal combined with a data signal, and a quadrature C/A-code signal combined with the same data signal. The L2 signal is derived from a 1227.6 MHz carrier and a P-code signal combined with the data signal. Usually, the power ratio of the P code to the C/A code in the L1 signal is one half.

Figure 2:
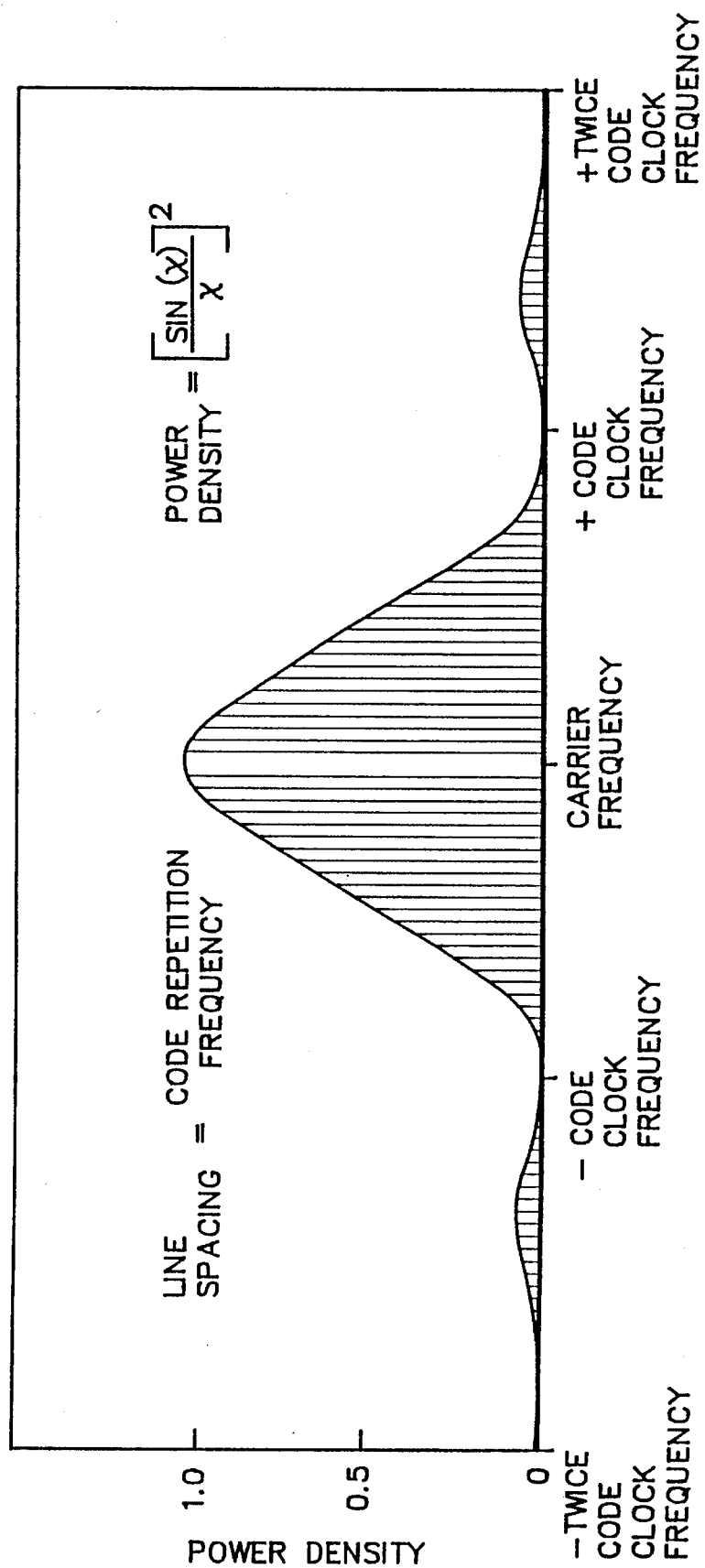
FIG. 2 is a graph showing the spectral density of a spread spectrum signal transmitted from a GPS satellite.

The frequency spectrum of a carrier signal modulated by a pseudorandom code is shown in FIG. 2. Frequency is plotted along the horizontal axis, and power density of the spectral components is plotted along the vertical axis. The vertical lines in the spectrum power density curve are spaced by a frequency equivalent to the code repetition frequency. The carrier frequency is suppressed, as indicated by the missing spectral line at the center of the distribution. The shape of the curve is of the form Power Density=$[(\sin x)/x]^2$, where x is proportional to the frequency f, given by the relation $x=\pi f/f_{clock}$ and where $f_{clock}$ is the pseudorandom code clock frequency. As is apparent from FIG. 2, primary nulls in the distribution occur at frequencies of $+f_{clock}$ and $-f_{clock}$ with respect to the center frequency.

In a conventional GPS receiver, two important functions are performed before the receiver position can be computed. One is to measure an apparent or pseudo-range to each of at least four satellites being used (for three-dimensional position determination), it being understood that only three satellites are needed for two-dimensional position determination. The other function is to recover the data modulated onto the carrier signals. For highly accurate baseline measurements in survey applications, the carrier signals L1 and L2 are recovered from the received signals, and carrier phase information is used to derive a more accurate measurement of receiver relative position. The mathematical equations used in position determination from GPS signals are well known and form no part of the present invention.

Each receiver must be able to distinguish one satellite from another. For this purpose, each satellite generates a different pseudorandom code for its P code and for its C/A code. The receiver has multiple channels, each of which has P-code and C/A code generators that can generate any of the satellite codes, for matching with the incoming signals and correctly identifying each satellite.

Carrier recovery by correlation

Measurement of the pseudo-range is achieved by generating a replica of the P code (and/or of the C/A code) and then correlating the replica with the code received from the satellite. If the replica and the received code are properly aligned in time, the result of the correlation process is a sharply defined peak or spike in the frequency spectrum of the output signal. The spectral peak is centered at the original carrier frequency, which had been suppressed by code modulation in the satellite. Thus, the correlation process may be thought of as "despreading" the received signal to obtain the original carrier signal, still modulated with data bits at a relatively slow 50-Hertz rate. The recovered carrier signal, and in particular its phase, may be used in survey applications for precise determination of the relative propagation time between receivers at two or more positions. The recovered carrier is demodulated to obtain the data, which can then be used in conjunction with the pseudo-ranges from multiple satellites to determine the position of the receiver.

Effect of P code encryption

Use of the P code in GPS receivers is rendered more difficult by encryption of the P-code before it modulates the carrier. Because of this encryption, the received encrypted P-code does not match the locally generated P-code, and locking onto the incoming signal is rendered impossible with a conventional GPS receiver. Since the L2 signal is modulated only with P-code (and data), access to the L2 carrier by the conventional correlation approach therefore is denied when the P-code is encrypted. One solution to this problem is, instead of correlation, to square the received signal to obtain access to the L2 carrier. When a biphase modulated carrier signal is multiplied by itself, the result is a signal of twice the carrier frequency with all of the modulation removed. This is apparent from the trigonometric identity:

$$\cos 2x = 1 - 2\sin^2 x.$$

If one substitutes $x=2\pi f_c t$, where $f_c$ is the carrier frequency, it will be seen that:

$$\sin^2 2\pi f_c t = \tfrac{1}{2}(1-\cos 4\pi f_c t)=\sin^2(2\pi f_c t+\pi).$$

The result is the same regardless of the biphase modulation. Therefore, squaring provides a technique for recovering the second harmonic of the original carrier signal without regard to the nature of any biphase modulation present on the received signal. The principal disadvantages of this approach are that the signal-to-noise ratio of the resultant carrier signal is substantially degraded and the wavelength is halved, resulting in half-cycle ambiguities.

Experimental basis for the invention

Figure 3:
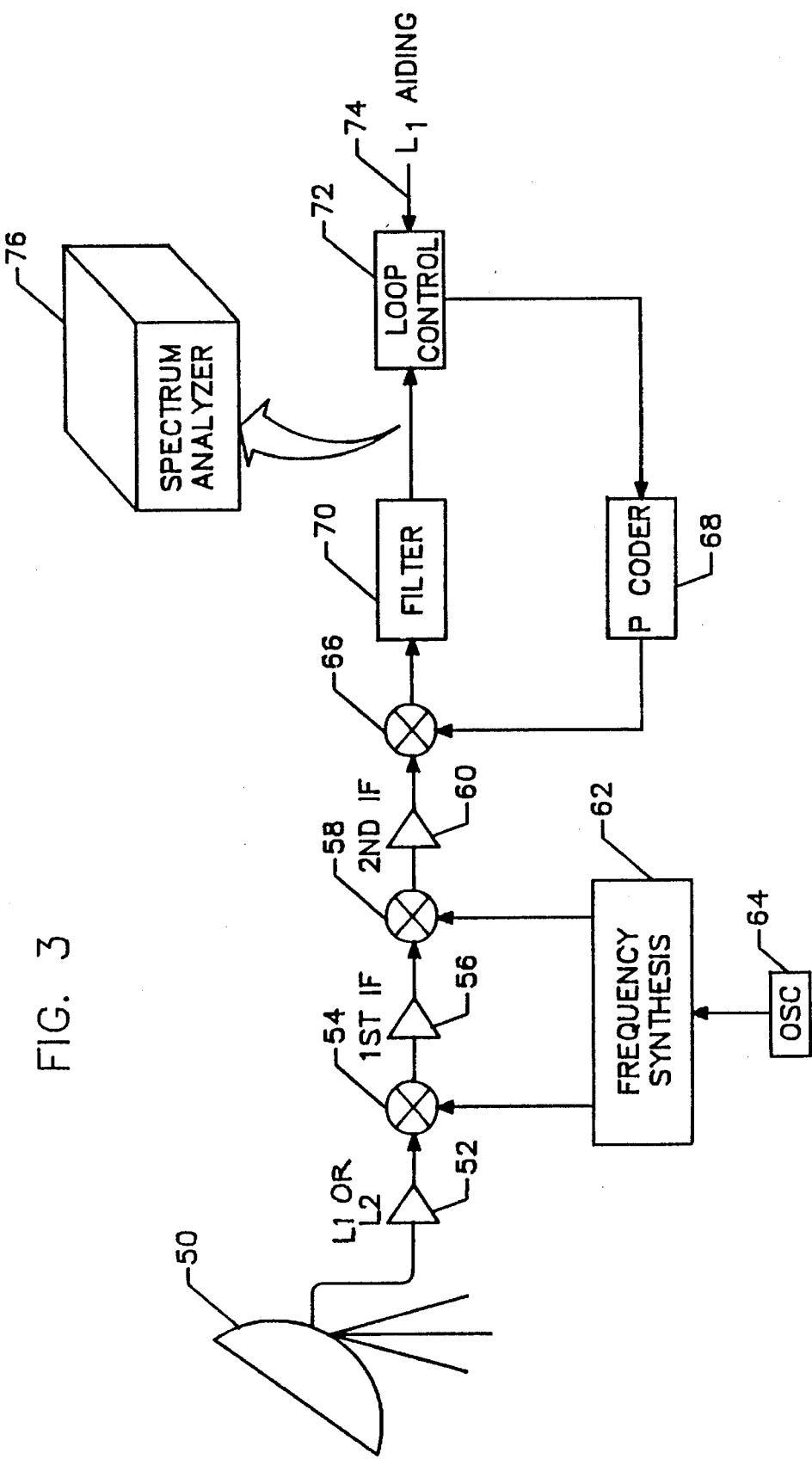
FIG. 3 is a block diagram of test apparatus used to analyze GPS satellite signals with P-code encryption.

The significant improvements resulting from use of the present invention are derived in part from characteristics of the P-code encryption, which may be observed by spectral analysis of the encrypted signals. FIG. 3 shows in block diagram form how a GPS receiver was connected experimentally to observe the principal characteristics of the encrypted P code. This receiver apparatus includes an antenna 50 and an associated preamplifier 52 through which an incoming L1 or L2 signal is processed. For purposes of the experiment, the antenna 50 is a directional dish antenna pointed at a selected satellite. The signals are first processed by two intermediate-frequency stages, including a first mixer 54, a first IF amplifier 56, a second mixer 58, and a second IF amplifier 60. Locally generated oscillator signals are provided to the first and second mixers 54 and 58 by a frequency synthesis circuit 62, which derives its frequency standard from an oscillator 64.

The output of the second IF amplifier 60 is connected to a correlator 66, a second input of which is derived from a P code generator 68, which generates a replica of the P code for the satellite being tracked. The output of the correlator 66 passes through a filter 70 to a loop control circuit 72, the principal purpose of which is to provide control signals to the P code generator 68 to maximize the spectral peak in the correlator output. As indicated at 74, the loop control circuit is aided by timing signals obtained as a result of conventional correlation of the C/A code in the L1 GPS signal. A spectrum analyzer 76 is attached to various points in the receiver test system to observe the nature of the encrypted P code signals.

Figure 4:
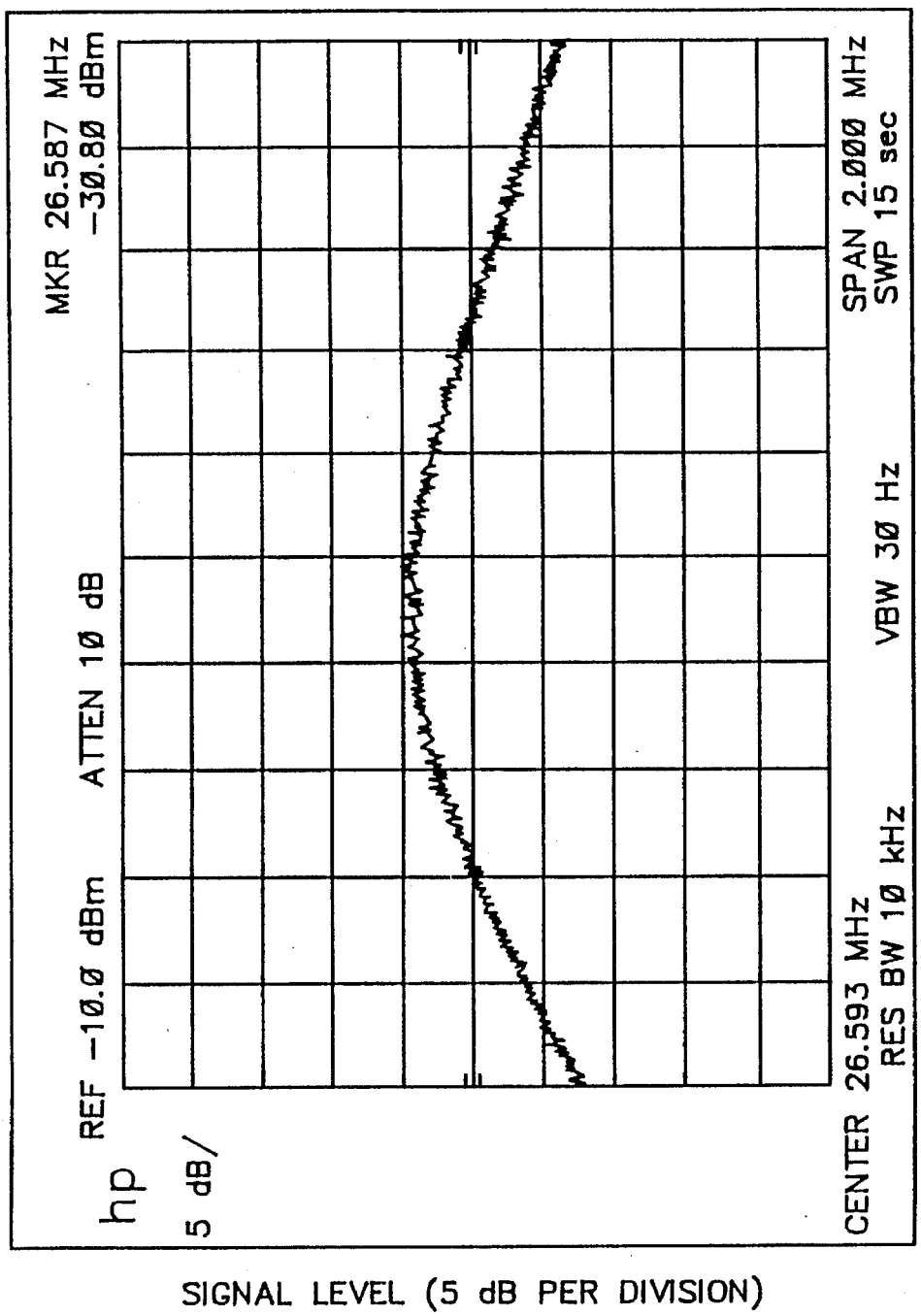
FIG. 4 is a graph showing the noise response of a filter shown in FIG. 3.

FIGS. 4–7 show some of the test results that were derived from the apparatus of FIG. 3. First, FIG. 4 gives the noise response of the filter 70. The output signal level, expressed in dB, is plotted against frequency for an input signal consisting of broadband noise. For this figure and for FIGS. 5–7, the center frequency of the filter is 26.593 MHz, the frequency scale is 200 kHz per division, and the output signal level scale is 5 dB per division.

Figure 5:
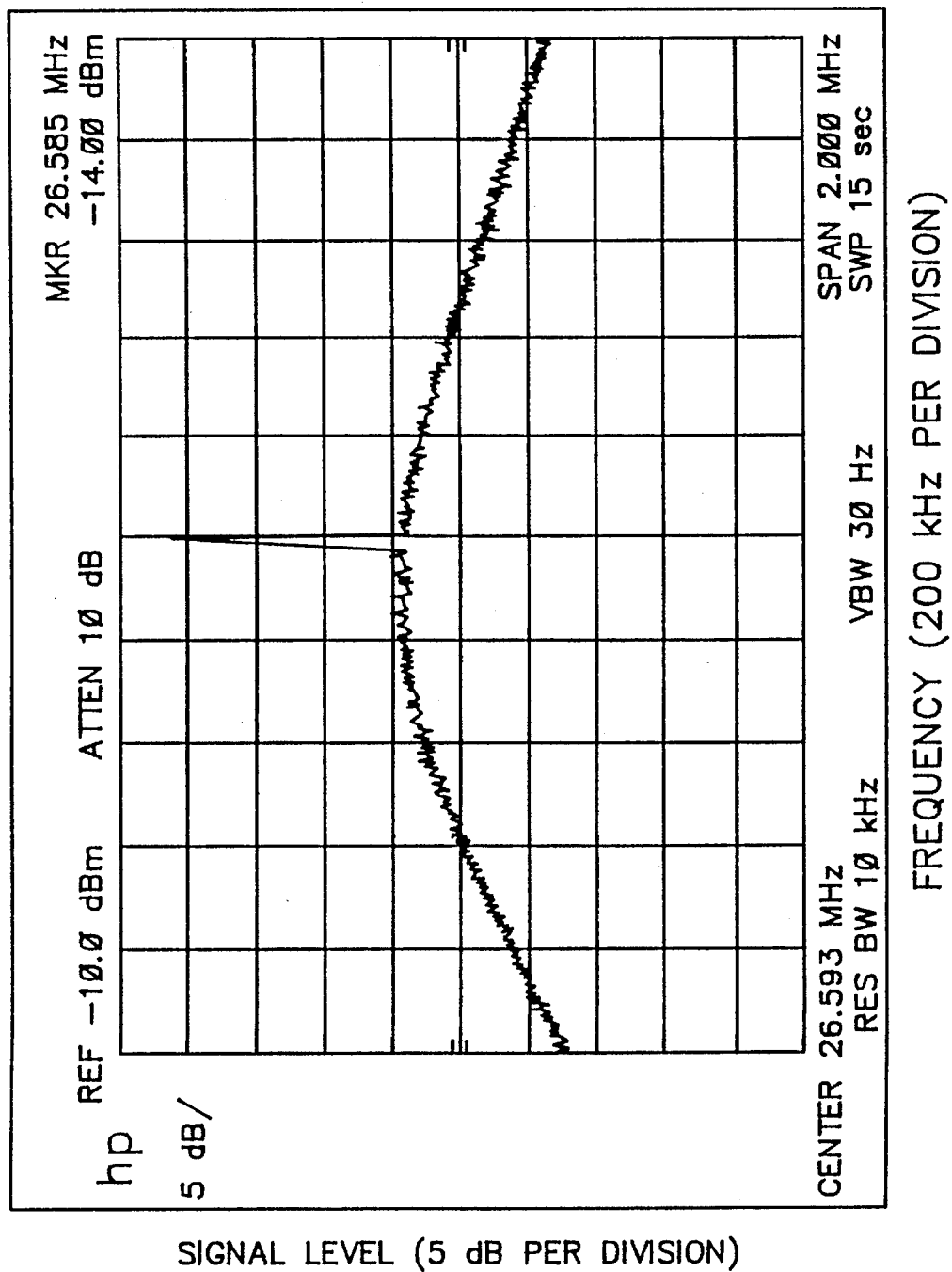
FIG. 5 is a graph showing the output of the filter in FIG. 3 when the test apparatus is receiving a nonencrypted P-code signal and correlating it with a locally generated P code.
Figure 6:
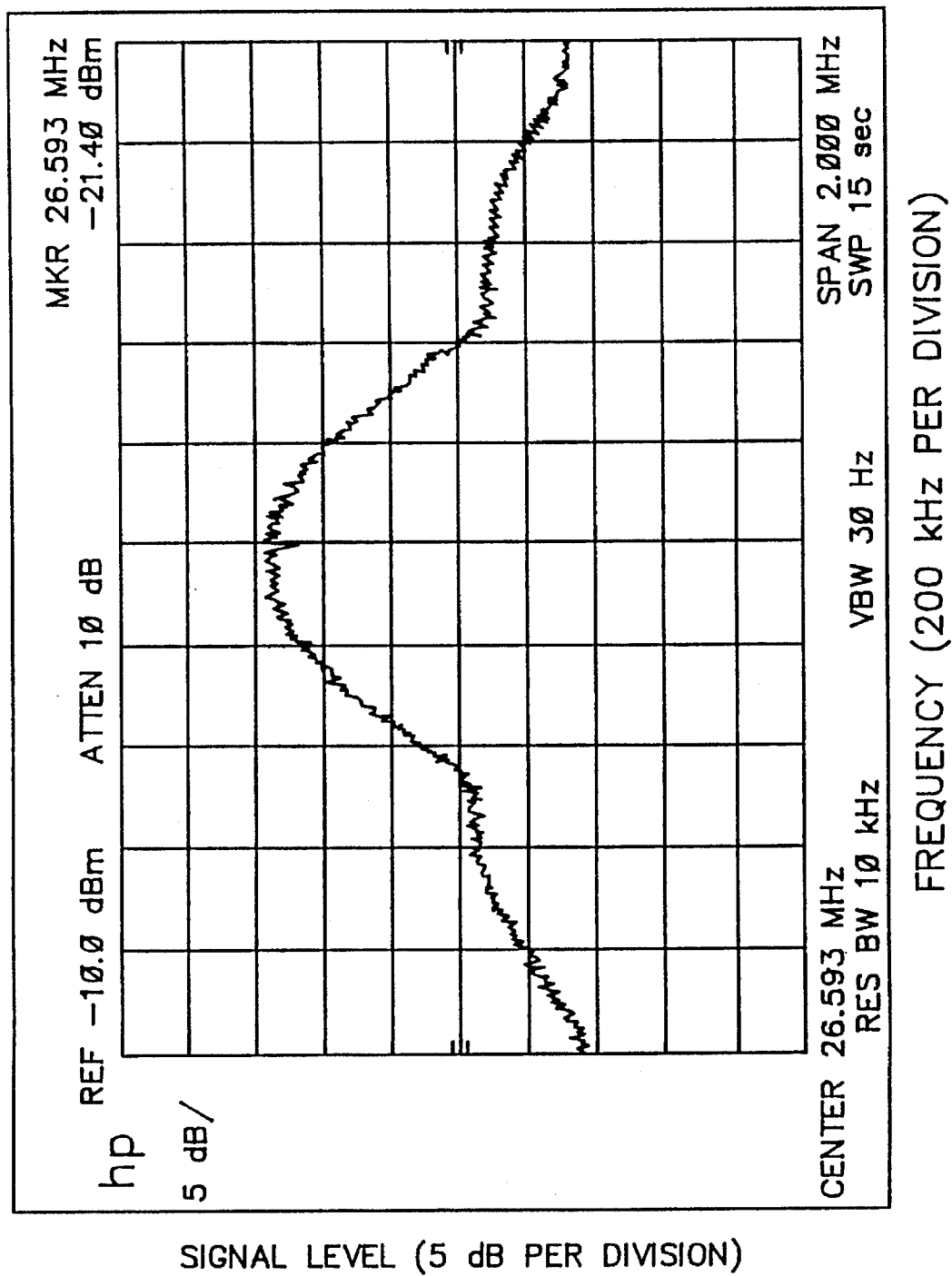
FIG. 6 is a graph similar to FIG. 5, but showing the filter output when the apparatus is receiving an encrypted P-code signal.
Figure 7:
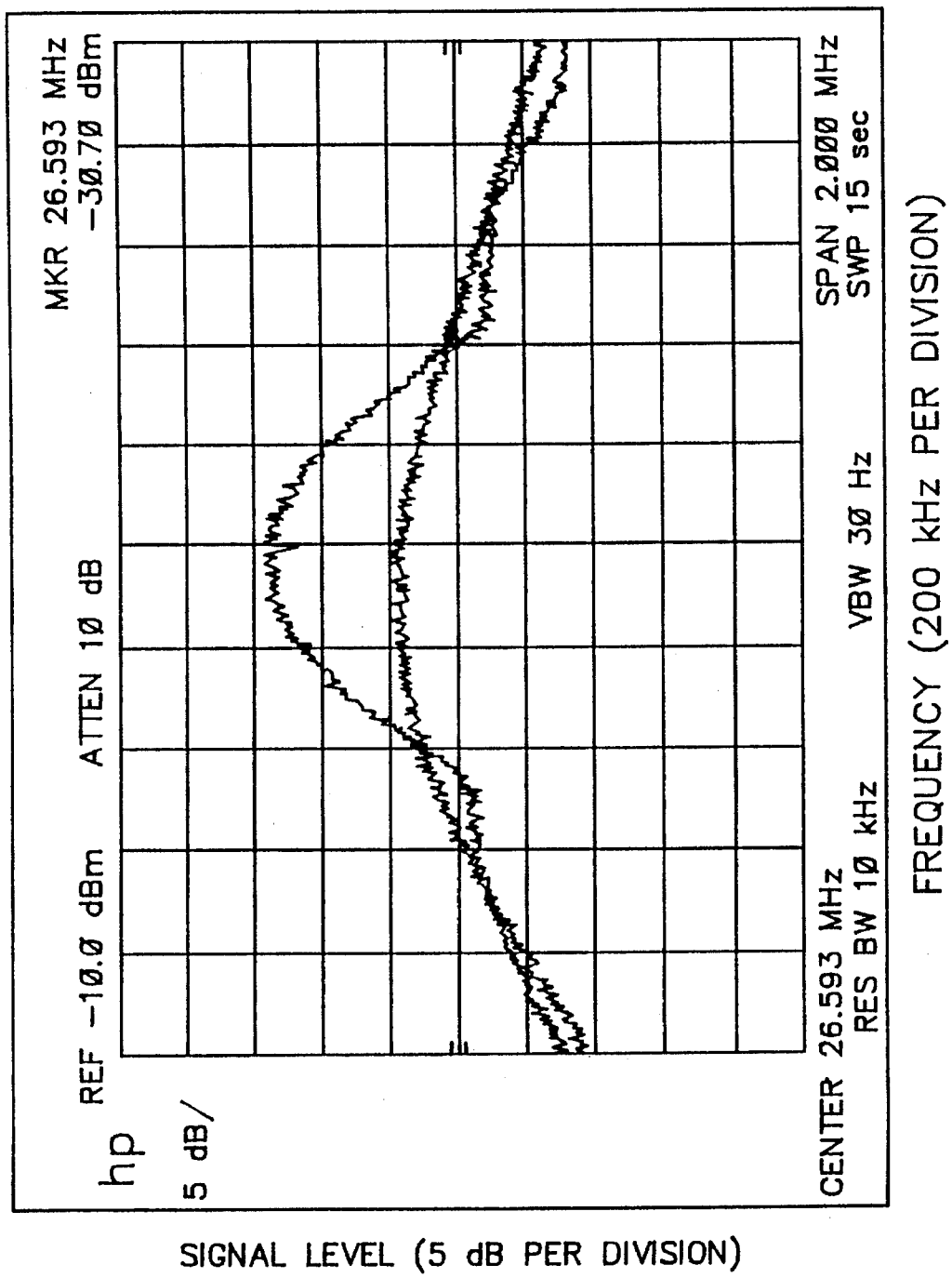
FIG. 7 is a graph combining FIGS. 5 and 6 into one figure.

FIG. 5 shows the output of the filter 70 when the antenna is receiving a nonencrypted P code and the P-code correlation process is operating as intended. The central peak in the spectral output of the filter is indicative of the carrier signal. FIG. 6 shows the filter output when the P code is encrypted. The correlation process in this case can only produce a very indistinct spectral peak. FIG. 7 is a composite of FIGS. 4 and 6, and shows the characteristic $[(\sin x)/x]^2$ shape of the imperfectly correlated P code signal.

Two important characteristics of the encrypted P code are apparent from FIG. 7. First, the encryption is actually an additional code superimposed on the P code; and second, the bandwidth of the encryption is significantly less than the bandwidth of the P code itself. The spectrum of the encryption appears to be of the form $[(\sin x)/x]^2$, with first nulls located at +500 kHz and −500 kHz. One aspect of the present invention makes use of these characteristics to derive the L2 carrier signal with significantly enhanced signal-to-noise ratio.

More detailed analysis of the encrypted P-code data obtained during the experiments, in comparison with the nonencrypted P-code, permits the encryption code interval to be closely estimated. Basically, this phase of the analysis involves correlation of the encrypted P-code signals with P-code signals that are not encrypted. The resulting encryption code has intervals that vary over time, but are easily determinable. As will be further explained, these encryption code intervals are used in one form of the invention and are assumed to have been accurately determined by the detailed analysis of the experimental data.

Significance of mathematical expression of frequency terms:

Specific equations have been given throughout the text and figures which involve mathematical operations on the signals from one or both of the L1 and L2 frequencies. the signs for the L1 and L2 terms in these equations are presented for a specific frequency plan, namely where the L2 IF (intermediate frequency) is positive 10.23 MHz and the L1 IF is negative 10.23 MHz. The choice of IF is not fundamental to the present invention and the equations presented can be made to fit any possible frequency plan by multiplying the L1 and L2 terms by appropriately scaled constants.

Significance of coherency of GPS signal components:

Each embodiment of the invention makes use of the coherency of the various portions of the GPS signal. The carrier signal and pseudo-random codes transmitted by the GPS satellites are all generated from a single oscillator and timing unit and are therefore coherent with one another. Code edges for the C/A code on L1 and the P code on both L1 and L2 all occur practically simultaneously (there is actually a π/4 carrier phase cycle offset between C/A and P codes) and occur in a fixed relationship with the phase of the suppressed L1 and L2 carrier signals. The received signal maintains these timing relationships except for differences caused by ionospheric induced signal delays.

The coherency of the codes and the carrier is used by the invention to provide improved GPS measurements. Only one of the phase and code tracking loops must be designed with a wide bandwidth to accommodate dynamics and variations in the receiver's oscillator. All other tracking loops can then be narrowed by aiding them with the output of the first loop that is tracking the dynamics. The narrowed tracking loop bandwidths decrease error due to random noise and allow the signals to be tracked at much reduced signal-to-noise ratios.

When the P-code signals are degraded by encryption, the best tracking performance is obtained by tracking the L1 suppressed carrier phase using the non-encrypted C/A code, the strongest available signal, and then using the output of this loop to aid the tracking of the code on L1 and the code and suppressed carrier on L2. Typically, the L1 C/A carrier is tracked with a second or third order Costas loop with a 10 to 30 Hz noise bandwidth, which allows the receiver to track the carrier without loss of lock when subjected to accelerations of several times Earth's gravity. The L1 and L2 codes and the L2 carrier are tracked with phase-locked loops of, typically 1 to 0.1 Hz bandwidth.

The improvements

In accordance with one embodiment of the invention (shown in FIG. 8), the incoming encrypted P-code signals carried by the received L1 and L2 signals are each correlated with a locally generated P-code and bandpass filtered before being cross-correlated to derive a signal at the carrier difference frequency L1–L2. After further filtering, this signal can be used to measure the full-wavelength phase and frequency of the L1–L2 carrier difference frequency. Bandpass filtering over a bandwidth of approximately 500 kHz provides the same or better (perhaps 3 dB better) improvement in signal-to-noise ratio as the Keegan patent (U.S. Pat. No. 4,972,431) but with a better ability to resolve carrier cycle ambiguity because the full wavelength of L1–L2 is obtained.

In a second embodiment of the invention (shown in FIGS. 9A and 9B), a received GPS signal (either L1 or L2) is resolved into in-phase (I) and quadrature (Q) components which are each digitally correlated with a locally generated P-code signal, integrated over the known encryption time intervals, and then digitally squared to produce the second harmonic of the downconverted L1 or L2 carrier signal. A conventional phase locked loop can be used to track these squared signals to provide theta, the predicted phase, for correlation with the incoming L1 or L2 carrier signals. In a variant of this embodiment (shown in FIGS. 10A, 10B, and 11), the L1 and L2 received signals are individually resolved into I and Q components, individually digitally correlated with the appropriate L1 or L2 locally generated P-code signal, and individually integrated over the encryption interval. The I and Q signals derived from these processes are then digitally cross-correlated to provide a full-wavelength signal at the carrier difference frequency L1–L2. When implemented with sufficient resolution, digital cross-correlation provides a signal-to-noise ratio which is equivalent to that from cross-correlation of the corresponding analog signals. However, because timing of the integrate and dump processes and the cross-correlation are controlled by individually tracked P-codes, additional circuitry is not required to compensate for the ionospheric delay between reception of the L1 and L2 signals.

Yet another embodiment of the invention (shown in FIGS. 14A and 14B) uses code-aided cross-correlation of L1 and L2 to obtain the benefit of the longer wavelength of L1–L2. Independent P-code tracking loops are used for code tracking of L1 and L2. The cross-correlation of L1 and L2 is used to close the L1-aided L2 carrier tracking loop.

In yet another embodiment of the invention (shown in FIGS. 15A and 15B), L2 carrier phase measurements are obtained by complex squaring of the L2 signal, and half-cycle ambiguity of the double-frequency component of the squared L2 signal is resolved by means of direct cross-correlation of L1 and L2. The phase polarity of L1–L2, i.e., the phase of L1 with respect to L2, obtained from the direct cross-correlation, is used to resolve half-cycle ambiguity of the squared L2 signal.

Figure 14A:
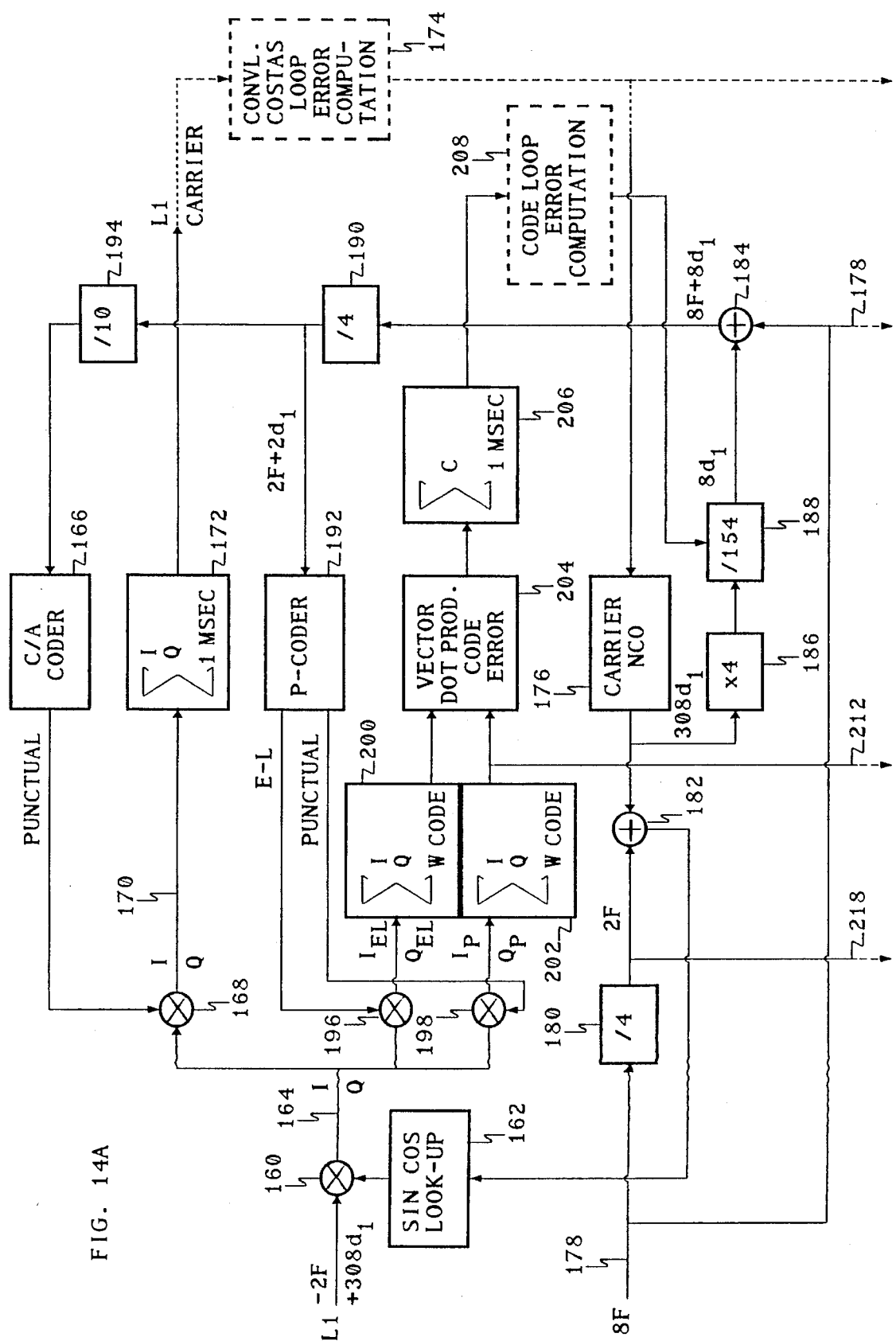
FIGS. 14A and 14B together define a block diagram of another preferred embodiment of the invention, using code-aided cross-correlation of L1 and L2.
Figure 14B:
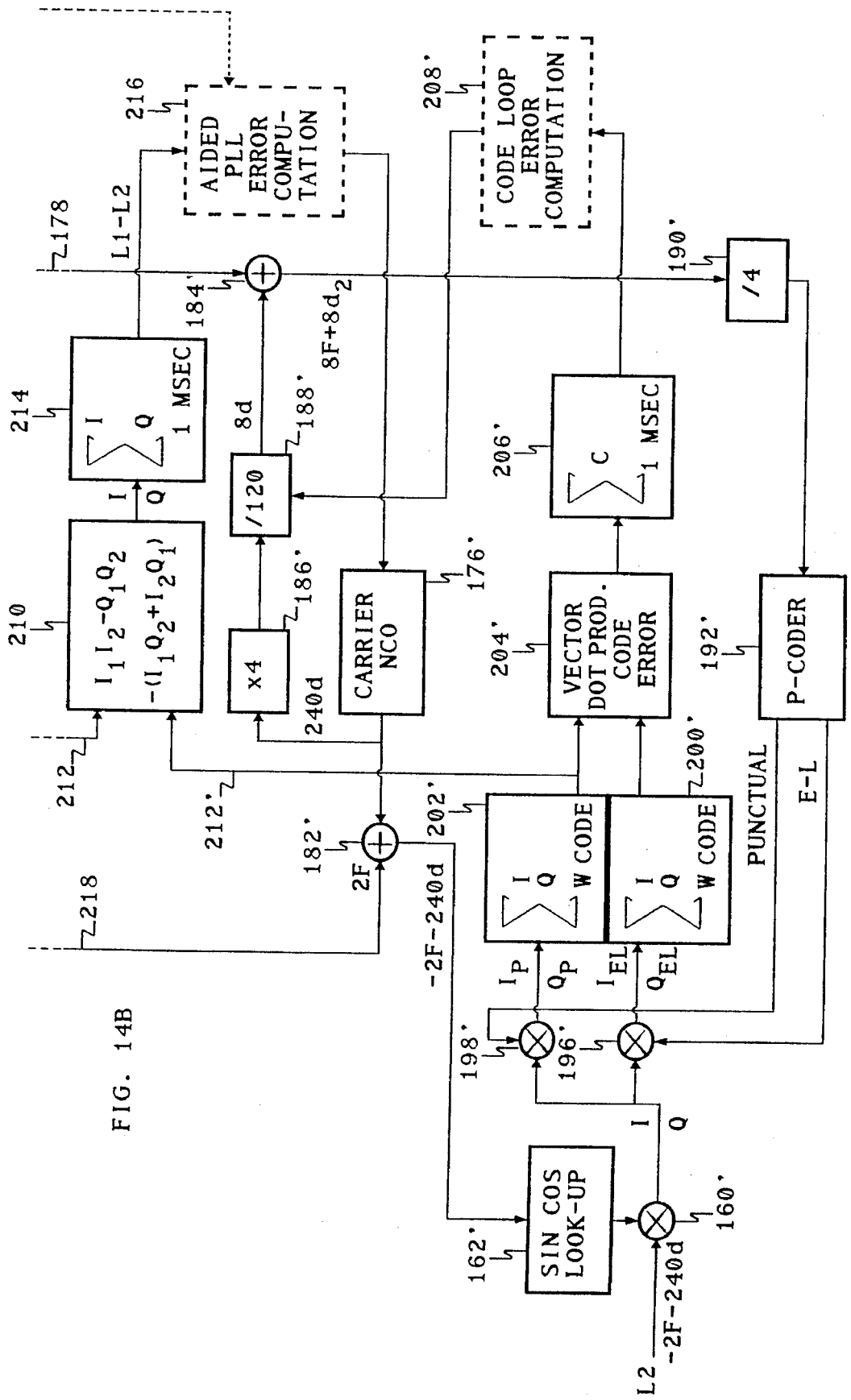
Figure 15A:
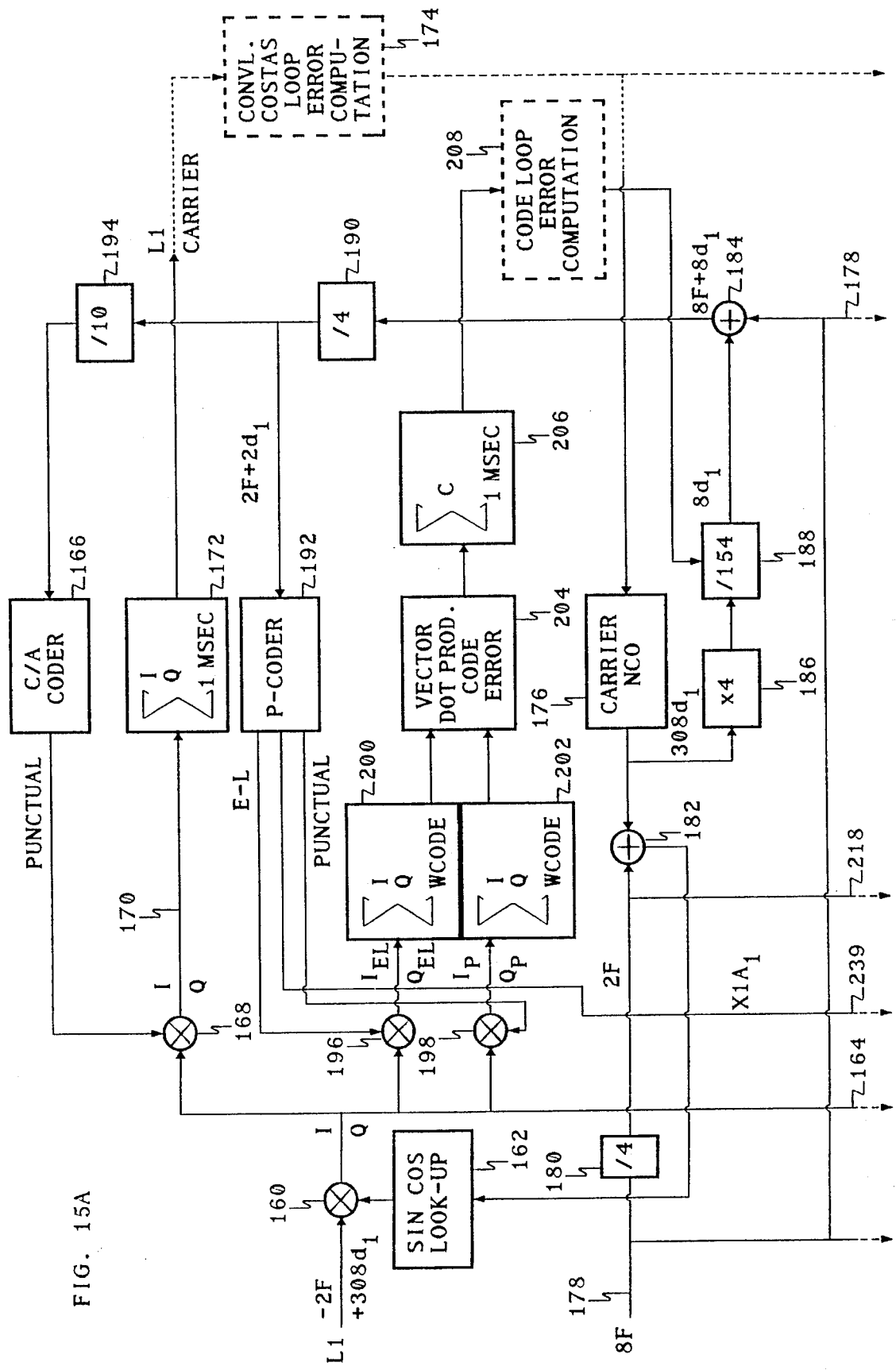
FIGS. 15A and 15B together define a block diagram of yet another preferred embodiment of the invention, using code aided squaring for carrier measurements and direct cross-correlation of L1 and L2 to resolve the half-cycle ambiguity inherent in the carrier measurements.
Figure 15B:
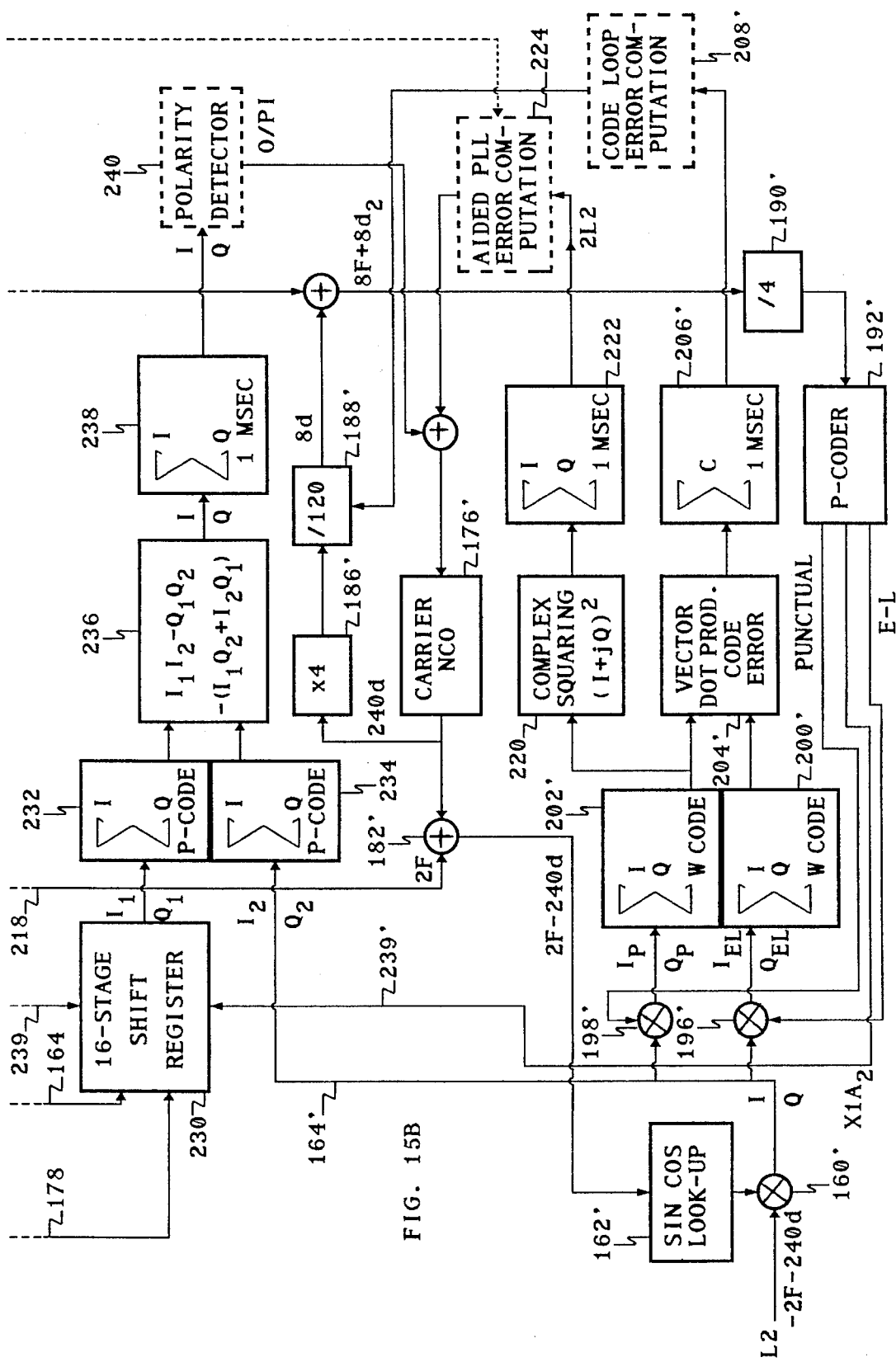

Still another embodiment of the invention (shown in FIGS. 16A and 16B) is similar to the embodiment of FIGS. 15A and 15B except that the cross-correlation of L1 and L2 is P-code aided. This embodiment, as well as the embodiments of FIGS. 14A, 14B, 15A and 15B, also takes advantage of a stronger L1 carrier signal derived from C/A code correlation, wherein the C/A code phase can be derived either from the L1 P-code tracking loop or from a C/A code tracking loop.

Cross-correlation of L1 and L2 P-code with prefiltering

Figure 8:
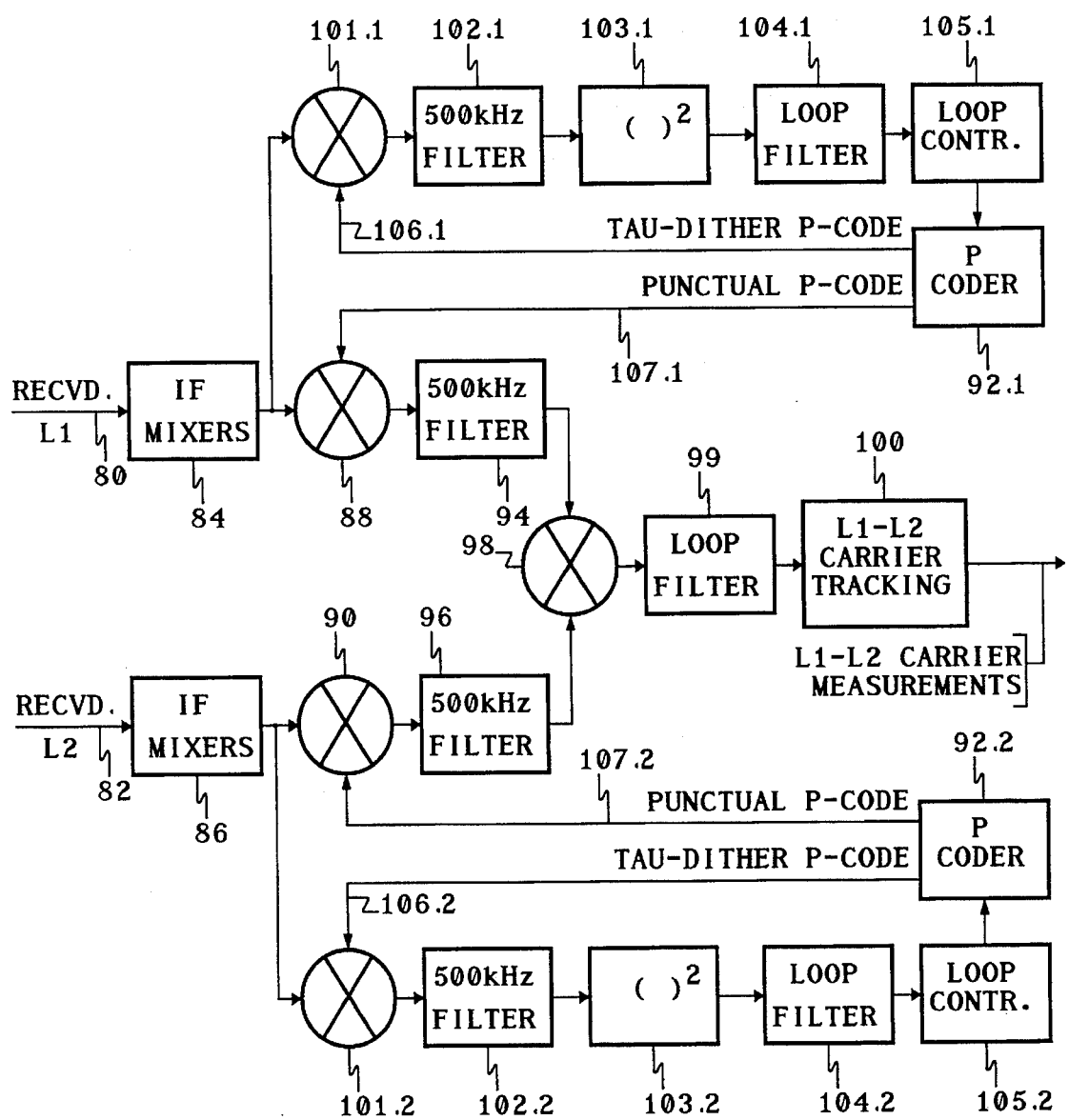
FIG. 8 is a simplified block diagram of a receiver system configured in accordance with one aspect of the present invention, in which received L1 and L2 signals are bandpass filtered before cross-correlation to obtain the full wavelength of the L1–L2 carrier phase difference.

FIG. 8 depicts an aspect of this invention in which GPS signals L1 and L2 are received on lines 80 and 82, respectively, and are then subject to down-converting in intermediate-frequency (IF) mixers 84 and 86, respectively. The resulting signals are input to correlators 88 and 90, respectively, for correlation with locally generated P-code signals from P-code generators 92.1 and 92.2, respectively. The outputs of the correlators 88 and 90 are processed by bandpass filters 94 and 96, respectively, and then input to a cross-correlator 98. Provided that the relative delay between L1 and L2 signals due to the ionospheric refraction is small compared to the reciprocal of the filter bandwidth, the output of the cross-correlator 98 has a component at frequency L1–L2, which provides an improved capability for resolving carrier phase ambiguity because of its 86 cm wavelength rather than the 43 cm wavelength obtained with squaring. The output of the cross-correlator 98 is processed through a loop filter 99 and L1–L2 carrier tracking control logic 100 to obtain the L1–L2 carrier phase measurements.

Generation of a punctual P-code signal for input to the correlators 88 and 90 is controlled by two identical P-code tracking loops. For the L1 signal, the P-code tracking loop includes P-coder 92.1, a correlator 101.1, another 500 kHz filter 102.1, a squaring circuit 103.1, a loop filter 104.1, and a loop control circuit 105.1. Output from the IF mixers 84 is transmitted to the correlator 101.1, together with a tau-dither P-code signal on line 106.1 from the P-coder 92.1. The output of the correlator 101.1 is processed through the 500 kHz filter 102.1, the squaring circuit 103.1, the loop filter 104.1 and the control circuit 105.1, and used to control the timing of the P-coder 92.1. The P-coder 92.1 also outputs a punctual P-code signal, on line 107.1, which is input to the correlator 90. An identical P-code tracking loop is used for the L2 signal, including the P-coder 92.2, a correlator 101.2, another 500 kHz filter 102.2, a squaring circuit 103.2, a loop filter 104.2, and a loop control circuit 105.2.

The circuit of FIG. 8 is in part similar to known prior art in which L1 and L2 received signals are cross-correlated to obtain an L1–L2 carrier signal used to obtain carrier phase in a phase-locked loop. The novel aspect of the embodiment of the invention depicted in FIG. 8 is the correlation with P-code and the presence of the two bandpass filters 94, 96, which ideally have a pass band of approximately 500 kHz, as determined by observing the nature of encrypted P-code signals received from GPS satellites.

Digital squaring of L2 signal over encryption interval

Figure 9A:
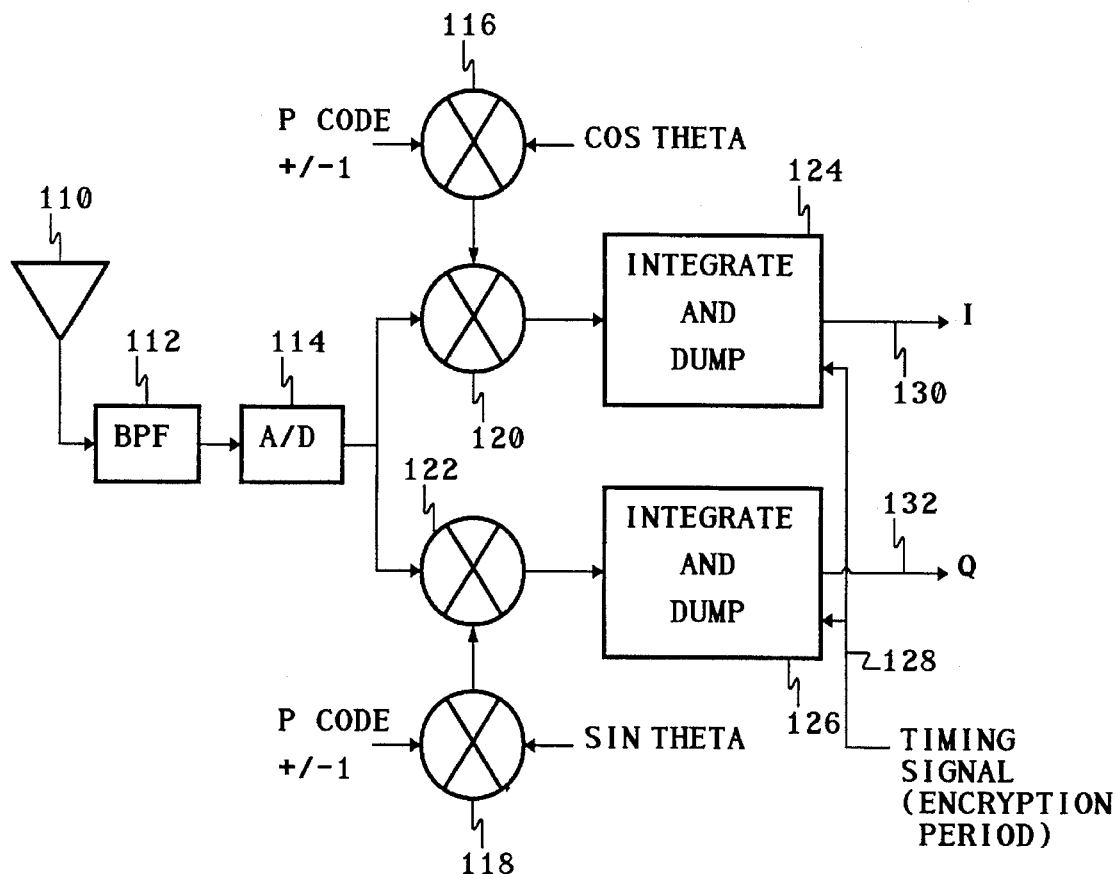
FIGS. 9A and 9B together comprise a block diagram of a digital embodiment of the invention in which received GPS signals derived from one carrier, such as L2, are digitally squared to remove the effects of P-code encryption.
Figure 9B:
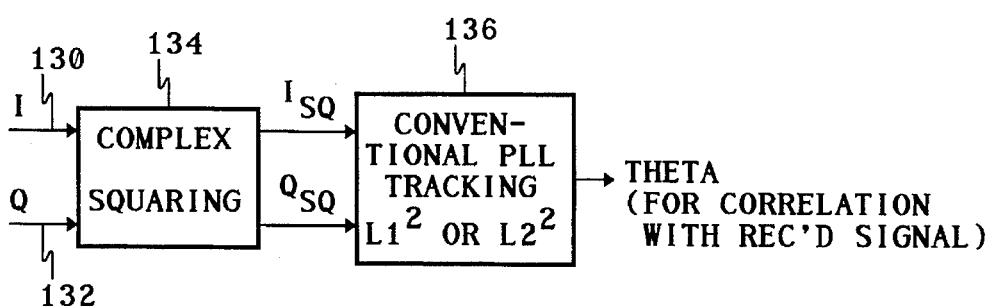

FIGS. 9A and 9B depict a digital form of the invention for squaring a signal derived from the received L2 signal and the locally generated P-code signal. Frequency down-conversion has been omitted for simplicity, but it will be understood that conventional down-conversion circuitry is needed. The L2 signal is received over antenna 110, processed by bandpass filter 112, and converted to digital form in an analog-to-digital converter 114. The latter may take the form of a hard limiter circuit, which provides a one-bit digital resolution in its output, or multi-level quantization may be used. The locally generated P-code signals are also in digital form (±1), and are input to multipliers 116 and 118 together with sine and cosine values of an estimated carrier phase angle of the IF signals. The estimated phase angle $\theta$ is used to compute (or look up) corresponding values of $\sin \theta$ and $\cos \theta$, which are then input to the multipliers 116 and 118. The resulting products are input to multipliers 120 and 122, respectively, which also receive as inputs the digitized received signal values from the analog-to-digital converter 114. The outputs from multipliers 120 and 122 are fed to two integrate-and-dump circuits 124 and 126, respectively. The latter circuits are controlled by timing signals on line 128 to provide an integration period equal to the encryption signal interval. This timing interval has been determined by analysis of the encrypted P-code and in particular by analysis of the result of correlating encrypted P-code signals with non-encrypted P-code signals.

The signals periodically output from the integrate-and-dump circuits, on lines 130 and 132, are digital in-phase (I) and quadrature (Q) components of the received L2 signal. These are input to a complex squaring circuit 134, which generates components of the squared signal, indicated as $I_{SQ}$ and $Q_{SQ}$, respectively. These components are input to conventional phase-lock-loop circuitry for carrier recovery, as indicated at 136.

Complex squaring in the squaring circuit 134 performs multiplication of the input signal by itself, in accordance with the expression:

$$(I+jQ)^2 = (I^2 - Q^2) + j2IQ$$
$$= I_{SQ} + jS_{SQ}.$$

$I_{SQ}$ and $Q_{SQ}$ are used by a conventional phase-locked tracking loop which derives the estimated carrier phase angle $\theta$ used in FIG. 9A.

Digital squaring of the received signal, with integration over the encryption interval, achieves a similar result to squaring the corresponding analog signal after P-code correlation and bandpass filtering, i.e., signal-to-noise performance is significantly improved and less time is needed to resolve single-cycle ambiguity of the carrier.

Digital cross-correlation of L1 and L2 signals over the encryption interval

Figure 10A:
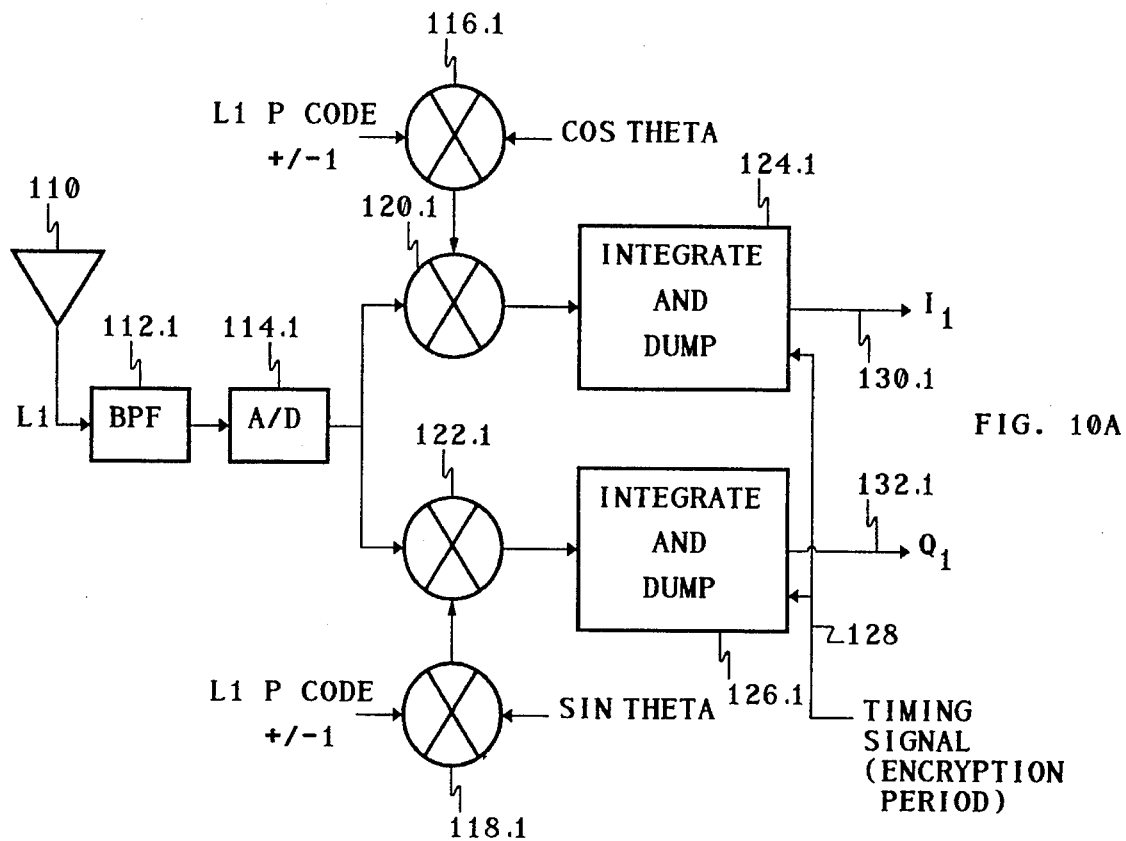
FIGS. 10A and 10B together comprise a block diagram of another digital embodiment of the invention, in which received GPS signals derived from both L1 and L2 carriers are correlated with a digital P-code signal and integrated over the encryption time period.
Figure 10B:
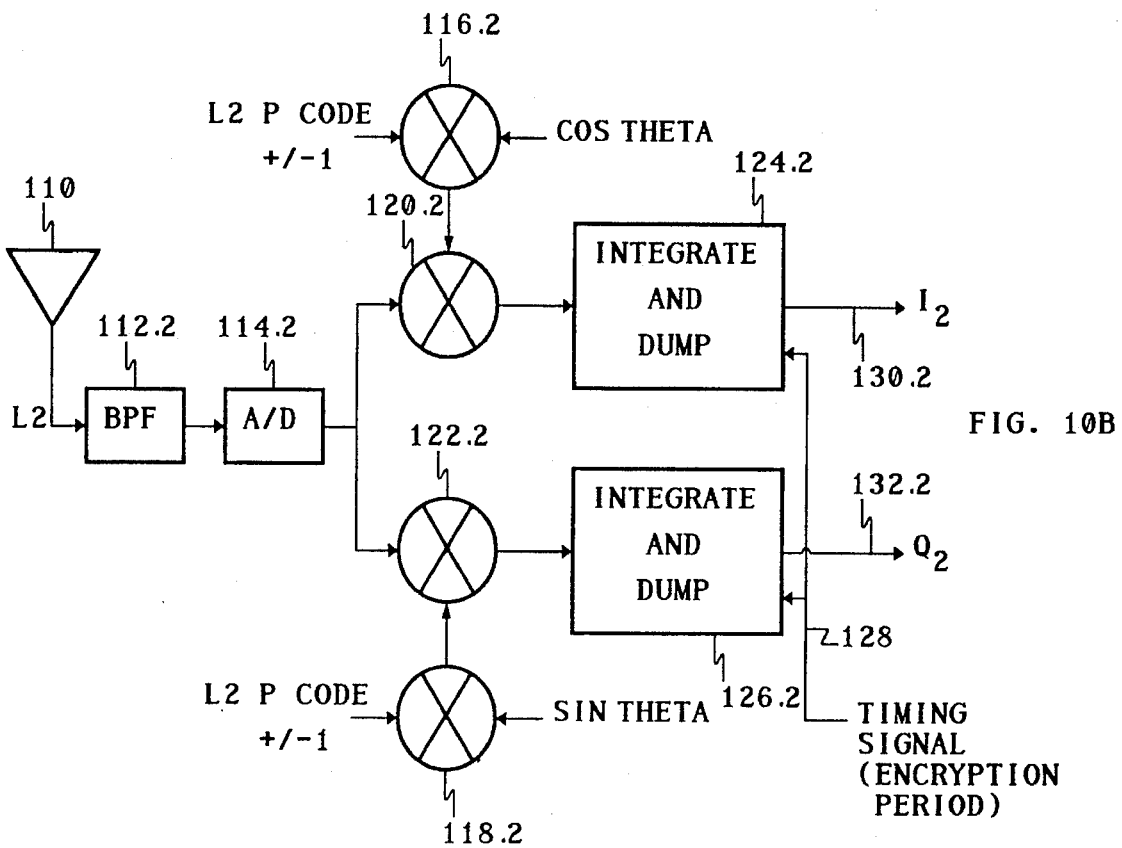
Figure 11:
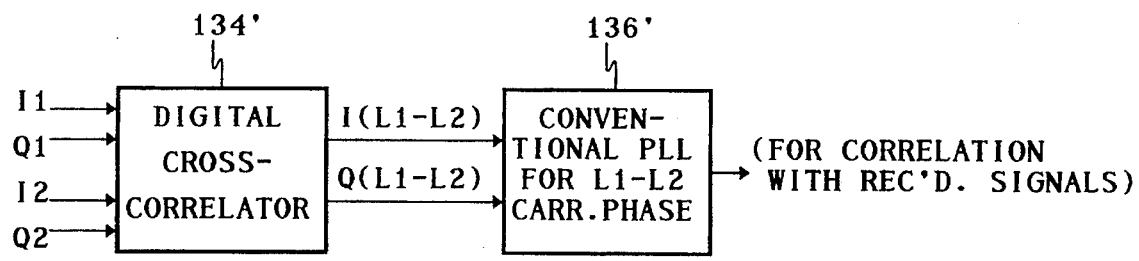
FIG. 11 is a block diagram showing how the signals generated in FIGS. 10A and 10B are cross-correlated to remove the effects of P-code encryption.

This technique is analogous to cross-correlation of the received L1 and L2 analog signals but has significant further advantages. The circuitry needed is shown in FIGS. 10A and 10B. Since many of the components perform the same functions as those explained with reference to FIG. 9A, the same reference numerals have been used where appropriate, with a suffix "0.1" or "0.2" to indicate the L1 or the L2 circuitry. As in FIG. 9A, frequency down-conversion has been omitted for simplicity, but it will be understood that conventional down-conversion circuitry is needed. The circuitry for generating digital signals $I_1$ and $Q_1$ from the received L1 signal and the L1 P-code signal is shown in FIG. 10A. It includes a bandpass filter 112.1 passing the P-code-modulated signal, an analog-to-digital converter 114.1, multipliers 116.1, 118.1, 120.1, and 122.1, and integrate-and-dump circuits 124.1 and 126.1. The $I_1$ and $Q_1$ signals are output from the integrate-and-dump circuits 124.1 and 126.1 on lines 130.1 and 132.1. The carrier phase angle, $\theta_{L1}$, is derived from digital squaring as previously described with reference to FIG. 9A.

Similarly, the circuitry for generating digital signals $I_2$ and $Q_2$ from the received L2 signal and the L2 P-code signal is shown in FIG. 10B. It includes a bandpass filter 112.2 passing the P-code modulated signal, an analog-to-digital converter 114.2, multipliers 116.2, 118.2, 120.2, and 122.2, and integrate-and-dump circuits 124.2 and 126.2. The $I_2$ and $Q_2$ signals are output from the integrate-and-dump circuits 124.2 and 126.2 on lines 130.2 and 132.2. The carrier phase angle, $\theta_{L2}$, is derived from digital squaring as previously described with reference to FIG. 9A.

The output signals $I_1$, $Q_1$, $I_2$ and $Q_2$ from the circuits of FIGS. 10A and 10B are input to a digital cross-correlator 134' (FIG. 11), which generates as outputs I and Q signals associated with the frequency difference L1–L2. These signals, designated I(L1–L2) and Q(L1–L2) in the figure, are input to conventional phase-lock-loop circuitry, indicated at 136'. The digital cross-correlator 134' performs correlation in accordance with the expression:

$$(I_1 + jQ_1)(I_2 - jQ_2) = (I_1I_2 + Q_1Q_2) + j(Q_1I_2 - I_1Q_2)$$
$$= I_{(L1-L2)} + jQ_{(L1-L2)}.$$

$I_{L1-L2}$ and $Q_{L1-L2}$ are used to estimate the phase of the difference carrier frequency L1–L2 by a phase-locked tracking loop or similar device.

This digital cross-correlation of the L1 and L2 signals has the same advantage as analog cross-correlation of the signals, namely that the time to resolve single-cycle phase ambiguity in the carrier is significantly reduced because the frequency difference L1–L2 is being used instead of 2L1–2L2. There is also an improvement of approximately 13 dB in the signal-to-noise ratio over conventional cross-correlation approaches. The digital approach has an additional advantage in that there is no need to compensate for differential ionospheric delay of L2 with respect to L1. This is because the ionospheric delay is only 0.3 μs at most while the integrate-and-dump circuits produce outputs at approximately 2 μs intervals (500 kHz rate). Therefore, corresponding L1 and L2 outputs from the integrate-and-dump circuits easily can be associated with each other without loss due to the differential delay, and variable time delay circuitry is completely unnecessary.

Digital processing of P-code tracking errors

Figure 12:
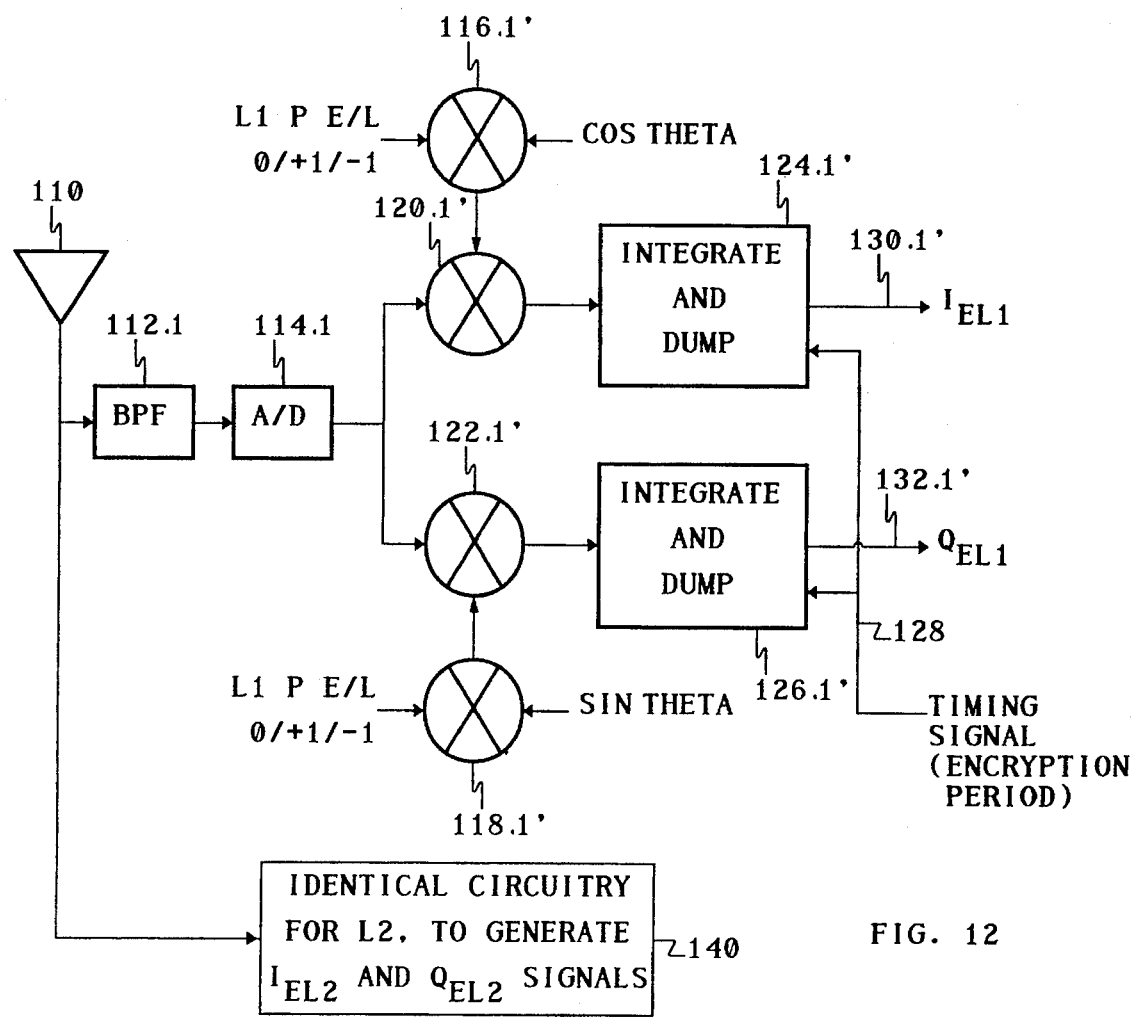
FIG. 12 is a block diagram showing how a digital technique similar to that of FIGS. 10A and 10B is used to generate digital early-late signals for both L1 and L2 P-code.

FIG. 12 shows how digital early-late signals are generated, using circuitry similar to that of FIGS. 9A, 10A and 10B. The circuitry includes multipliers 116.1', 118.1', 120.1', and 122.1', and integrate-and-dump circuits 124.1' and 126.1'. Multipliers 116.1' and 118.1' have as inputs the cosine and sine, respectively, of an estimated phase angle and the digital value of a signal designated L1 $P_{E/L}$. This is the P-code early-late signal for the L1 carrier and has possible values of 0, +1 or −1. The outputs of multipliers 116.1' and 118.1' are multiplied by digital L1 values in multipliers 120.1' and 122.1', and the outputs of these latter multipliers are accumulated in the integrate-and-dump circuits 124.1' and 126.1'. The resultant output signals, on lines 130.1' and 132.1' at the encryption interval, are designated $I_{EL1}$ and $Q_{EL1}$, respectively. Identical circuitry, indicated only generally in block 140, generates corresponding signals from the L2 received signals, and these output signals are designated $I_{EL2}$ and $Q_{EL2}$.

Figure 13A:
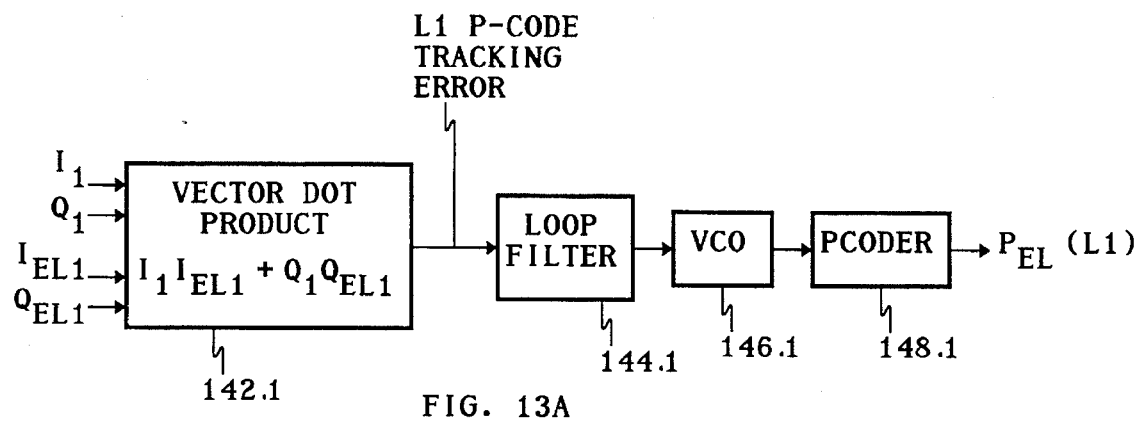
FIGS. 13A and 13B are block diagrams showing how the early-late signals derived in FIG. 12 are used to derive L1 and L2 P-code tracking error signals.

As shown in FIG. 13A, an L1 P-code tracking error is computed in a vector dot product circuit 142.1. This tracking error then is used to generate the $P_{EL}$ signal for L1, using conventional components such as a loop filter 144.1, a digital phase shifter or voltage-controlled oscillator 146.1, and a P-code generator 148.1. The vector dot product circuit 142.1 computes the vector dot product of the vector $I_1+jQ_1$ and the vector $I_{EL1}+jQ_{EL1}$. The vector dot product of two vectors is the product of the vector magnitudes multiplied by the cosine of the angle between them. Specifically, the vector dot product of these two vectors is given by the expression:

$$I_1 I_{EL1} + Q_1 Q_{EL1}.$$

Figure 13B:
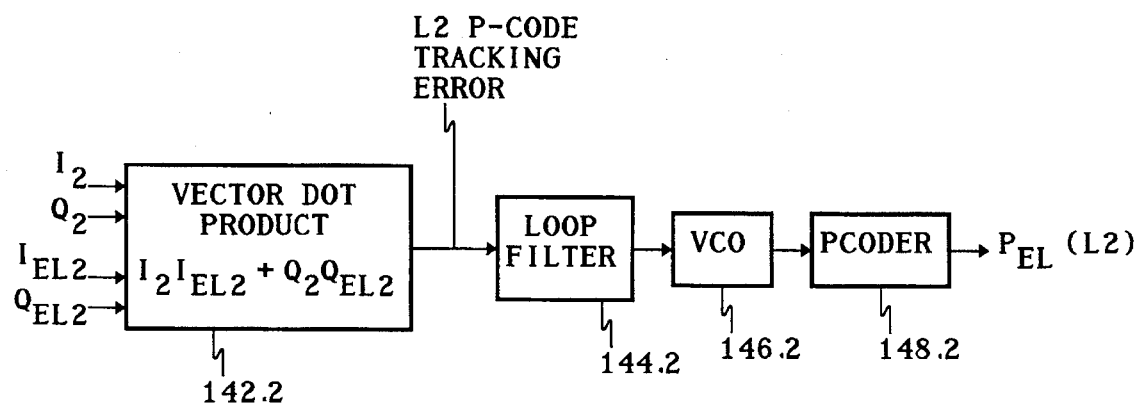

FIG. 13B depicts identical circuitry to FIG. 13A but for computing the $P_{EL}$ signal for L2. In this case the L2 P-code tracking error is computed as $I_2 I_{EL2} + Q_2 Q_{EL2}$. The P-code tracking errors derived for L1 and L2 in FIGS. 13A and 13B, respectively, are used to control the timing of the L1 P-code and the L2 P-code in FIGS. 10A and 10B.

The P-code tracking error controls the timing of the L1 P-code and the L2 P-code in FIGS. 9A, 10A and 10B. Using P-code tracking error signals in this manner at the encryption rate results in a 6 dB improvement over a tau-dither technique. The approach requires no knowledge of the encryption technique, except that encryption timing has been learned by experiment. The resulting P-code pseudo-range measurements from both L1 and L2 are obtained with greater accuracy and with reduced multipath effects.

Alternate embodiment using code-aided cross-correlation

FIGS. 14A and 14B show the principal receiver functions for an embodiment of the invention using code-aided digital cross-correlation of L1 and L2 signals. New reference numerals are used in describing these figures, but it will be appreciated that many of the components have exact equivalents in previously described figures.

In FIGS. 14A, 14B, 15A, 15B, 16A and 16B, processing is performed digitally. In FIG. 14A, the received L1 signal is assumed to have been appropriately down-converted in frequency, filtered, and digitized before being input to two mixers, shown diagrammatically as mixer 160, into which sine and cosine values are also input from a sine/cosine look-up table 162. Thus, the outputs from the mixers 160 are I and Q signal components, shown on line 164. These L1 I and Q values are correlated with signals from a C/A coder 166 in a correlator 168, the output of which provides I and Q signals on line 170 to a summer circuit 172. The latter performs the same function as the integrate-and-dump circuits described with reference to other drawing figures and integrates the I and Q values over 1-millisecond time intervals.

The output of the summer circuit 172 provides signals representative of the L1 carrier. These are input to a conventional Costas loop error computation, indicated at 174 in broken lines. All of the components shown with broken lines are implemented in software or firmware in a microprocessor (not separately shown). The Costas loop error computation 174 provides a feedback signal to a carrier numerically controlled oscillator (NCO) 176, which produces an output at a frequency $308d_1$, the received L1 signal component due to the Doppler effect (including any frequency shift caused by inaccuracies in the receiver's reference oscillator). It is, of course, well known that both of the GPS L-band signals contain a frequency component due to the Doppler frequency shift caused by relative motion of the transmitting satellite with respect to the receiver. For the L1 signal, the received frequency is $308F+308d_1$, where F is a basic frequency from which all other GPS frequencies are derived (F=5.115 MHz), and $308d_1$ is the frequency due to the Doppler effect. After down-conversion in the illustrative embodiment of the invention, the L1 signal applied to the mixers 160 has a frequency of $-2F+308d_1$. It will be understood, of course, that other specific down-conversion factors also fall within the scope of the invention.

A basic sampling frequency of 8F is provided in the receiver, on line 178, which is divided by four in a frequency divider 180 to produce a frequency of 2F. A signal combiner 182 combines the basic 2F sampling signal and the 308d$_1$ signal from the carrier NCO 176 to produce a signal at frequency −2F+308d$_1$, which is used to drive the sin/cosine lookup table 162, effectively closing an L1 carrier tracking loop in the receiver.

Clocking signals for the C/A coder 166 are derived in part from the 8F sampling frequency on line 178. The 8F signal is combined in another combiner module with a Doppler frequency scaled to 8d$_1$, which is obtained by scaling the 308d$_1$ signal output from the carrier NCO 176. More specifically, the output of the carrier NCO 176 is scaled to 8d$_1$ by means of a frequency multiplier 186, which multiplies the frequency by a factor of four, and a frequency divider 188, which divides the frequency by a factor of 154. The output of combiner 184 is further divided by a factor of four in another frequency divider 190 to obtain a clock frequency of 2F+2d$_1$ to drive a P-coder 192. The clock frequency is divided by a factor of ten in frequency divider 194 to produce a clock signal to drive the C/A coder 166.

Code tracking of the L1 signal is achieved by means of signals provided by the P-coder 192, specifically an early-late signal and a punctual signal, which are applied, respectively, to two correlators 196 and 198, along with the I and Q signals on line 164. The outputs of correlator 196, which are I$_{EL}$ and Q$_{EL}$ signals, are input to a summing circuit 200, which integrates these signals over time intervals corresponding to the encryption code (the w code). Similarly, the outputs of correlator 198, which are I$_P$ and Q$_P$ signals, are input to a summing circuit 202, which also integrates these signals over the encryption interval. The output of the summing circuits 200 and 202 are input to a vector dot product circuit 204, which performs a vector dot product computation in the same way as the circuit illustrated in FIG. 13A, and produces a code error signal as its output. The code error signal is integrated over a 1-millisecond time interval in summation circuit 206, the output of which is provided to a conventional loop error computation 208. The latter provides control signals to one of the frequency dividers, specifically divider 188, which deletes and adds clock pulses in proportion to the code error signal, thereby closing the code tracking loop in the receiver.

The code tracking loop for the received L2 signal is similar to that for the received L1 signal, and the same reference numerals have been used in FIG. 14B for equivalent components, except that a prime symbol (') has been added for the L2 components. Thus, the received L2 signal is resolved into I and Q components by means of mixers 160' and sine and cosine signals provided by a sine/cosine look-up table 162'. The I and Q components are correlated with punctual and early-late P-code signals in correlators 196' and 198', and the results of the correlations are integrated over the w-code interval by summation circuits 200' and 202'. The integrated results are processed by a vector dot product circuit 204' to produce a code error signal that is integrated over a 1-millisecond interval in summation circuit 206'. A loop error computation 208' feeds back a control signal that regulates the clock signal applied to the P-coder 192'.

Carrier tracking for the L2 signal is achieved by means of a cross-correlation circuit 210, which has as its inputs L1 I and Q signals from the output of the summation circuit 202, over line 212, and L2 I and Q signals from the output of the summation circuit 202', over line 212'. The I and Q outputs of the cross-correlation circuit 210 are given by I$_1$I$_2$−Q$_1$Q$_2$ and −(I$_1$Q$_2$+I$_2$Q$_1$), respectively. These outputs are integrated over a 1-millisecond time interval in summation circuit 214.

The resultant L1–L2 signals are input to a conventional phase-locked loop error computation 216, which also receives L1 signals from the L1 Costas loop error computation 174 for aided operation. The reason for using an aided phase-locked loop is that either squaring a received signal or cross-correlating two received signals results in a very poor signal-to-noise ratio, as compared to the signal-to-noise ratio associated with the L1 signal derived from a "nonsquared" C/A code. Because the L1 and L2 signals are basically coherent as received, except for ionospheric effects, any frequency error measured in a received L1 signal can be scaled to derive an equivalent frequency error for the L2 signal. Aided operation of the phase-locked loop takes advantage of this relationship. The frequency received from the L1 signal is scaled to L2 and used to achieve a narrower bandwidth for tracking the L2 carrier than could be achieved by employing cross-correlation without aiding the phase-locked loop.

Specifically, the phase-locked loop error computation 216 produces an error signal that is applied to the carrier NCO 176', the output of which is a Doppler frequency signal at frequency 240d$_2$. This is applied to a frequency combiner 182', which also receives a standard 2F frequency signal over line 218. The output of the combiner 182' is applied to the sine-cosine look-up table 162', to close the carrier tracking loop.

In summary, this embodiment of the invention uses the C/A code for L1 carrier tracking and p-code aided code tracking for both L1 and L2. (More generally, code tracking on L1 could be achieved by P-code aided code tracking or C/A code tracking.) L2 carrier tracking is achieved by means of cross-correlation of L1 and L2 to obtain a control signal to regulate an L2 carrier NCO.

Alternate embodiment using direct cross-correlation

FIGS. 15A and 15B show a further modification to the system of the invention in which L2 carrier tracking and phase measurements are performed by complex squaring of the L2 signal, and direct cross-correlation of L1 and L2 is used to resolve the half-cycle ambiguity in the carrier measurements. Code tracking of the L1 and L2 signals and L1 carrier tracking are performed as in the embodiment described with reference to FIGS. 14A and 14B.

More specifically, the portions of the receiver pertaining to L1 and L2 code tracking and to L1 carrier tracking have identical components to those shown in FIGS. 14A and 14B, and identical reference numerals have been used in FIGS. 15A and 15B to refer to equivalent components. The portions of FIGS. 15A and 15B that are different from FIGS. 14A and 14B will now be described.

L2 carrier tracking is performed by deriving punctual I and Q outputs from the encryption interval summation circuit 202' and applying these outputs to a complex squaring circuit 220. The function performed in this circuit is $(I+jQ)^2$, which is $I^2-Q^2+j2IQ$. The results of the complex squaring process are input to another summation circuit 222, which integrates the I and Q components over 1-millisecond time intervals. The outputs of the summation circuit 222 are input to an aided phase-locked loop error computation 224, which feeds back a control signal to the L2 carrier NCO 176'. Just as the aided phase-locked loop error computation 216 of FIG. 14B was L1-aided, the phase-locked loop error computation 224 of FIG. 15B takes advantage of the favorable signal-to-noise ratio associated with L1 measurements derived from C/A code and achieves a narrower tracking bandwidth for L2 measurements than could otherwise be obtained.

As shown in FIG. 15B, the components needed to resolve the half-cycle ambiguity of the L2 carrier include a shift register 230 for the L1 signals, two additional summation circuits 232 and 234, a cross-correlation circuit 236, another summation circuit 238, and a polarity detector 240. The shift register 230 receives L1 signals from line 164 and clocking signals at frequency 8F over line 178. The amount by which the L1 signals are delayed in the shift register 230 is determined by timing signals received from the P-coders 166 and 166' over lines 239 and 239', respectively. These timing signals are known as the X1A epoch of the P-coder, and the difference between them is indicative of the ionospheric delay to which the L2 signals are subject with respect to the L1 signals. As illustrated in FIG. 15B, the shift register 230 has sixteen stages. At a clocking frequency of 40 MHz, each stage is equivalent to a time delay of 25 ns (nanoseconds) and the entire register can interpose a total delay of 0.4 µs, which is more than enough to compensate for the maximum possible ionospheric delay. Therefore, the shift register effectively compensates for the differential ionospheric delay between L1 and L2 and produces effectively synchronized L1 and L2 signals which are next integrated, in summation circuits 232 and 234, over the variable interval defined by P-code polarity transitions. (This technique improves the signal-to-noise ratio of the cross correlation by an average of 3 dB, by taking advantage of the fact that the P-code polarity transitions do not occur every P-code chip.) The L2 signals input to summation circuit 234 are derived from the L2 I and Q lines 164'. The integrated L1 and L2 signals are then cross-correlated in circuit 236, and the results of the cross-correlation are integrated over 1-millisecond intervals in summation circuit 238. The polarity detector 240 provides a binary signal that is used to resolve the inherent half-cycle ambiguity of the L2 phase measurements, as further explained in the next descriptive section.

In summary, the embodiment illustrated in FIGS. 15A and 15B makes phase measurements using complex squaring of the L2 signal, taking advantage of a higher signal-to-noise ratio than would be obtained from direct cross-correlation for phase measurement. Then, direct cross-correlation is used solely for the purpose of resolving half-cycle ambiguity in the L2 phase measurements relative to the L1 measured phase.

Polarity detector

Figure 16A:
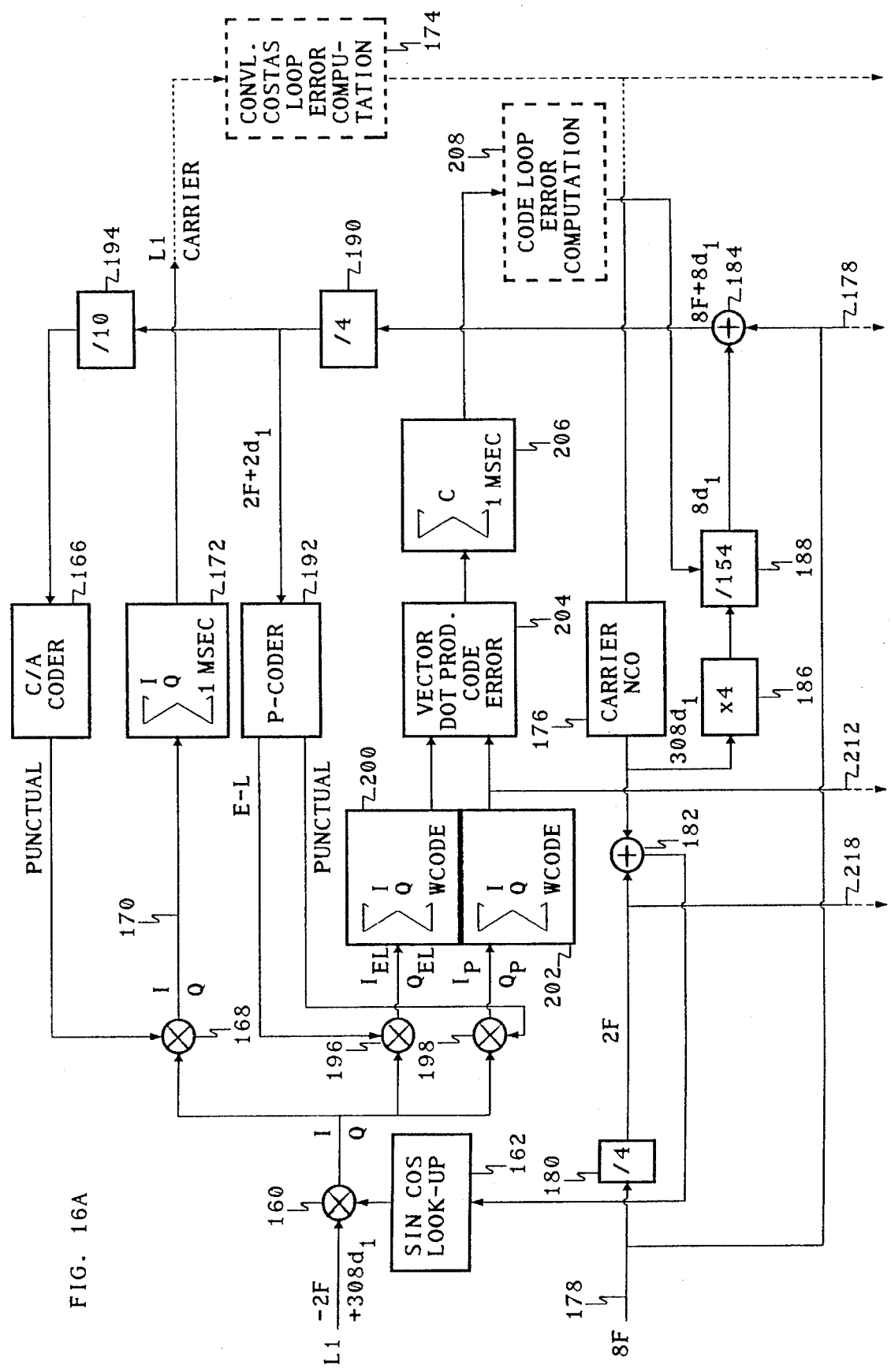
FIGS. 16A and 16B together define a block diagram of still another preferred embodiment of the invention, using code aided squaring for carrier measurements (as in the embodiment of FIGS. 15A and 15B) and using code-aided cross-correlation of L1 and L2 to resolve half-cycle ambiguity inherent in the carrier measurements.
Figure 16B:
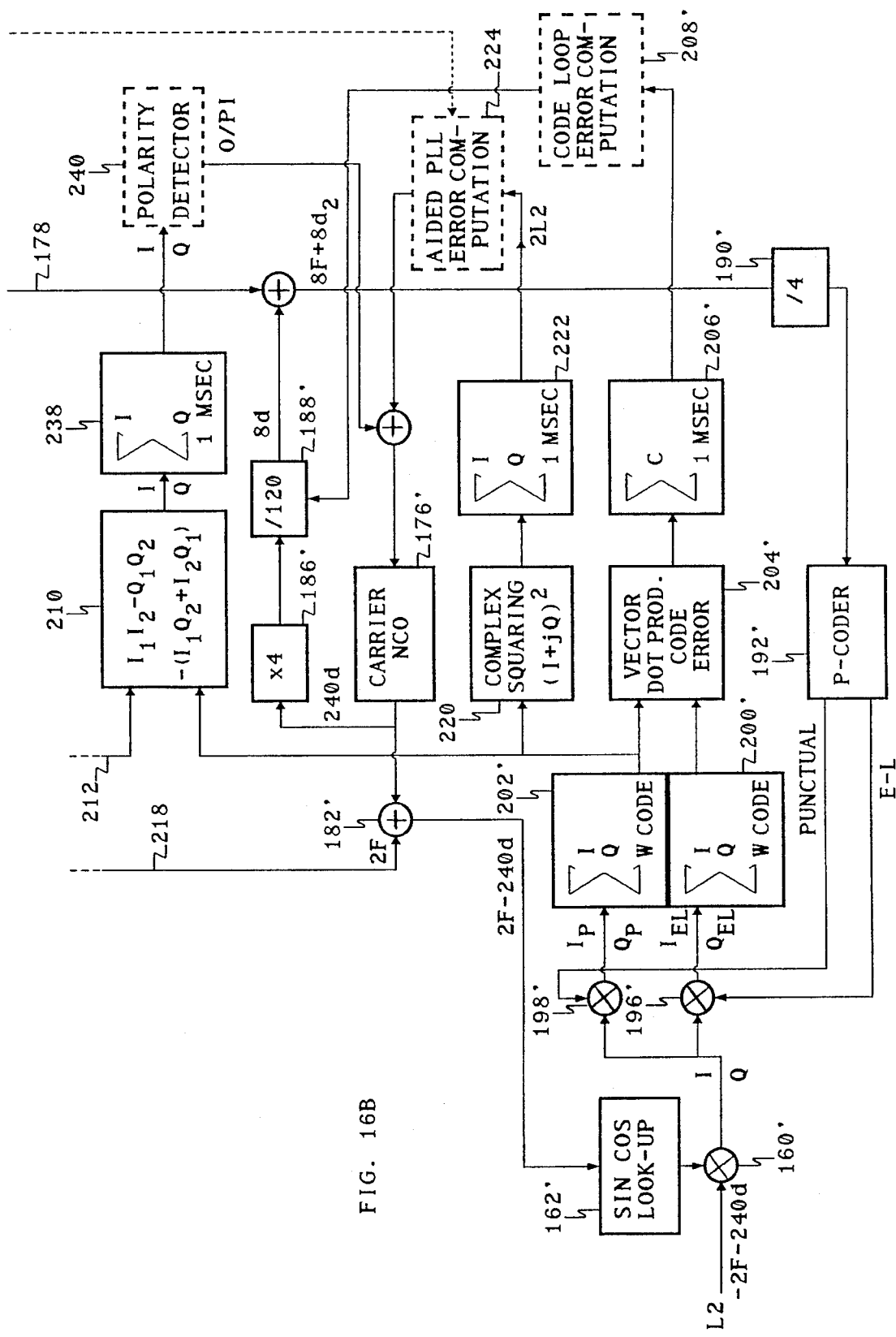

The polarity detector 240 in FIG. 15B, and a similar component in FIG. 16B, provides a convenient way of resolving half-cycle ambiguity in a squared carrier signal. The output of the polarity detector 240 has a phase value of 0° or 180° and is added to the input signal applied to the carrier NCO 176'. Carrier measurements on the L1 channel and the L2 channel are made simultaneously. On the L1 channel the measurement is of the phase of the L1 carrier. If code aided squaring is enabled (to remove the effects of encryption), the measurement on the L2 channel is of the phase of a double-frequency carrier (2L2). since the quantity desired is the phase of the L2 carrier, the latter measurement must be divided by two. Therefore, the resultant L2 carrier measurement has a range of only 0–180 degrees. In other words, there is an ambiguity as to which half cycle the measurement represents. By comparing the two phase measurements (L1 phase and 2L2/2 phase) with the output of the polarity detector, one can derive the correct half-cycle of the phase of 2L2/2, because the polarity detector provides a measurement of the relative phase between L1 and L2. Therefore, the measurements from the L2 channel can be reported to whole-cycle resolution even though the L2 signal is squared.

The advantage of using the output of the cross-correlator 210 for only polarity detection has significant advantages in both the direct cross-correlation approach (FIGS. 15A and 15B) and the P-code aided cross-correlation approach (FIGS. 16A and 16B, still to be discussed in detail). In the case of direct cross-correlation, the phase measured from the P-code-aided squaring channel is significantly less noisy than that from the cross-correlation channel. In the case of P-code-aided cross-correlation, the phase measured from the P-code-aided squaring channel has 3 dB less equivalent range noise than the phase measured from a P-code-aided cross-correlation channel.

Alternate embodiment using code-aided cross-correlation

FIGS. 16A and 16B show a further modification to the system of the invention. As in the embodiment of FIGS. 15A and 15B, carrier tracking and phase measurements are performed by complex squaring of the L2 signal. Code-aided cross-correlation of L1 and L2 is used to resolve the half-cycle ambiguity in the carrier measurements. Code tracking of the L1 and L2 signals and L1 carrier tracking are performed as in the embodiment described with reference to FIGS. 14A and 14B.

More specifically, portions of the receiver pertaining to L1 and L2 code tracking and to L1 carrier tracking have identical components to those shown in FIGS. 14A and 14B, and identical reference numerals have been used in FIGS. 16A and 16B to refer to equivalent components.

As in the FIG. 15B embodiment, L2 carrier tracking is performed in FIG. 16B by deriving punctual I and Q outputs from the encryption interval summation circuit 202' and applying these outputs to complex squaring circuit 220. The function performed in this circuit is $(I+jQ)^2$, which is $I^2-Q^2+j2IQ$. The results of the complex squaring process are input to summation circuit 222, which integrates the I and Q components over 1-millisecond time intervals. The outputs of the summation circuit 222 are input to an aided phase-locked loop error computation 224, which feeds back a control signal to the L2 carrier NCO 176'.

As shown in FIG. 16B, the components needed to resolve the half-cycle ambiguity of the L2 carrier are the same as those used in FIG. 14B, i.e., the cross-correlator 210, summation circuit 214 and polarity detector 240. The cross-correlator 210 receives P-code-aided L1 and L2 inputs and the summation circuit 214 generates (L1–L2) output signals for the polarity detector 240. The polarity detector provides phase information from which the polarity of the $(L2)^2$ carrier can be determined, i.e., the half-cycle ambiguity of the squared carrier signal can be resolved.

In summary, the embodiment illustrated in FIGS. 16A and 16B makes phase measurements using complex squaring of the L2 signal, taking advantage of a higher signal-to-noise ratio than would be obtained from direct cross-correlation for phase measurement. Then, code-aided cross-correlation is used solely for the purpose of resolving half-cycle ambiguity in the L2 phase measurements.

Conclusion

It will be appreciated from the foregoing that the present invention represents a significant advance in the field of GPS receiver technology. As in the case of the aforementioned U.S. Pat. No. 4,972,431, the techniques disclosed in this specification permit all users of GPS to benefit from recovery of the L2 carrier signal phase with substantially better performance characteristics than would be otherwise possible when P-code signals are encrypted prior to transmission.

As in the prior patent, the techniques of the present invention do not in any way circumvent the intended purpose of P-code encryption. Encryption is intended as an "antispoofing" measure. One of the principal concerns of those responsible for administering GPS is that someone may generate bogus satellite signals that have the format of proper GPS signals but, because they emanate from some other location and may also contain other false data, these signals would "spoof" military users of the system into deriving false position information. Encryption of the P-code signals effectively prevents this type of unauthorized activity. The present invention provides a technique by which nonmilitary users of the system may still derive satisfactory use of both L1 and L2 carrier signals, but without frustrating the "antispoofing" effect of the encryption. The invention permits passive users of the system to achieve improved survey equipment performance when P code encryption is enabled, but the invention does not decrypt the P-code signals and is of no help to anyone seeking to generate bogus signals.

To avoid unnecessary complexity, a number of conventional features of GPS receivers have been omitted from this specification. For example, a parallel receiver path is needed when the P-code is not encrypted, as explained in the aforementioned patent. Also, as is well known, multiple L1/L2 receiver channels are needed to process signals from multiple satellites simultaneously, as also explained in the earlier patent.

The present invention provides a number of advantages over the prior art. In particular, one embodiment is concerned with the use of encryption rate bandpass filters after P-code correlation in a receiver that cross-correlates L1 and L2 signals in an optimal linear fashion, thus achieving improved signal-to-noise performance. Some of the digital embodiments disclosed use digital squaring, at the encryption interval, of the L1 or L2 signals and digital cross-correlation, at the encryption interval, of the L1 and L2 signals and provide additional advantages over analog squaring and cross-correlation.

It will also be appreciated that, although specific embodiments of the invention have been described in detail for purposes of illustration, various modifications may be made without departing from the spirit and scope of the invention. Accordingly, the invention is not to be limited other than by the appended claims.

We claim:

1. A method for processing received signals in a satellite based positioning system, to generate a carrier difference signal having a frequency that is equivalent to the difference between first and second carrier signals that have been modulated with an encrypted P-code signal, the method comprising the following steps performed for each of a plurality of satellites:

receiving first and second signals transmitted from a satellite, the signals containing an encrypted version of a pseudorandom code sequence known as P code;

independently generating replicas of the P-code pseudorandom code sequence without encryption;

correlating each of the received first and second signals containing the encrypted P-code sequence with the locally generated replicas of the P-code sequence, to obtain two resultant signals, each having a frequency spectrum with a peak, the amplitude of which is indicative of the timing relationship between the received encrypted P-code sequence and the locally generated P-code sequence;

bandpass filtering each of the resultant signals from the correlating step;

cross-correlating the resultant signals after bandpass filtering, to obtain a carrier signal at a frequency equivalent to the difference between the frequencies of the first and second signals, with a desirably high signal-to-noise ratio; and controlling the step of generating the replicas of the P-code sequence, to closely align each of the P-code replicas with a corresponding P-code component in the first and second signals.

2. A method as defined in claim 1, wherein:

the step of controlling the step of independently generating the replicas of the P-code sequence includes obtaining timing information indicative of a pseudo-range pertaining to the satellite.

3. A method as defined in claim 1, wherein:

the step of bandpass filtering the result of the correlating step is performed with a bandwidth of approximately $\pm f_{null}/2$ centered in the frequency spectrum obtained from the correlating step, where $\pm f_{null}$ defines the positions of primary null points in the frequency spectrum.

4. A method as defined in claim 1, wherein:

the step of bandpass filtering the result of the correlating step is performed with a bandwidth less than about 10 megahertz and more than about 25 kilohertz.

5. A method as defined in claim 1, wherein:

the step of bandpass filtering the result of the correlating step is performed with a bandwidth of approximately 500 kilohertz.

6. For use in a global positioning system (GPS) receiver, apparatus for deriving carrier frequency difference signals for enhanced accuracy, the apparatus comprising the following components for use in processing signals from each of a plurality of satellites:

a receiving antenna, for receiving first and second carrier signals from a satellite, the signals containing an encrypted version of a pseudorandom code sequence known as P code;

generators of two independently timed P-code replicas of the P-code pseudorandom code sequence;

two correlator circuits, for correlating the received encrypted P-code sequence in the first and second carrier signals with the locally generated replicas of the P-code sequence;

two bandpass filters, for filtering the signals obtained from the correlator circuits; and a cross-correlator circuit, for cross-correlating the correlated and filtered signals, to obtain a carrier signal at a frequency equivalent to the difference between the frequencies of the first and second carrier signals, with a desirably high signal-to-noise ratio.

7. Apparatus as defined in claim 6, and further comprising:

circuitry, for each of the satellites from which signals are currently received, for generating P-code timing control signals to adjust the timing of the P-code generators for the first and second carrier signals.

8. A method for processing received signals in a global positioning system (GPS) receiver, to recover a carrier signal that has been modulated with an encrypted pseudorandom code, referred to as P code, the method comprising the steps of:

receiving a signal transmitted from each of a plurality of satellites, the signal containing an encrypted version of a pseudorandom code sequence referred to as P code;

converting the received signals to digital form;

generating a digital replica of the P-code pseudorandom code sequence without encryption, the replica having in-phase and quadrature components;

digitally correlating the received encrypted P-code sequence in digital form with the in-phase (I) and quadrature (Q) components of the locally generated replica of the P-code sequence, to obtain a succession of I and Q samples of correlated encrypted and non-encrypted P-code signals;

integrating the I and Q samples over a time period previously determined to be the encryption time period, to obtain successive I and Q values; and digitally squaring I and Q values obtained from the integrating step, to obtain squared I and Q values for subsequent processing that are independent of encryption, wherein digitally squaring of the I and Q values is performed in accordance with the expression $(I+jQ)^2$, where j is a mathematical operator equal to $(-1)^{1/2}$.

9. A method as defined in claim 8, wherein:

the method further comprises controlling the step of generating a digital replica of the P-code pseudorandom code sequence; and the step of controlling the step of generating the digital replica of the P-code pseudorandom code sequence includes obtaining timing information indicative of a pseudo-range pertaining to a satellite for which the digital P-code replica is generated.

10. For use in a global positioning system (GPS) receiver, apparatus for deriving carrier signals for enhanced accuracy, the apparatus comprising the following components for use in processing signals from each of a plurality of satellites:

a receiving antenna, for receiving a GPS signal transmitted from a satellite, the signal containing an encrypted version of a pseudorandom code sequence known as P code;

an analog-to-digital converter, for converting all received signals to digital form;

a digital P-code generator, for generating a digital replica of the P-code pseudorandom code sequence having in-phase (I) and quadrature (Q) components;

a digital correlator circuit, for correlating the received encrypted P-code sequence with the in-phase (I) and quadrature (Q) components of the locally generated replica of the P-code sequence;

two integrate-and-dump circuits, for generating a succession of I and Q values at time intervals corresponding to a previously determined encryption period of the encrypted P-code signals; and a digital squaring circuit, for squaring the correlated signals as represented by the succession of I and Q values, to obtain the second harmonic of the carrier signal with a desirably high signal-to-noise ratio.

11. Apparatus as defined in claim 10, and further comprising:

digital signal processing circuitry, for generating a control signal to adjust the timing of the digital P-code generator to maximize output of the carrier signal, and to obtain signals indicative of a pseudo-range for each satellite.

12. A method for processing received signals in a global positioning system (GPS), to generate a carrier difference signal having a frequency that is the difference between first and second GPS carrier signals that have been modulated with an encrypted pseudorandom code sequence, referred to as P code, the method comprising the steps of:

receiving first and second carrier signals transmitted from each of a plurality of satellites, the signals containing an encrypted version of a pseudorandom code sequence known as P code;

converting the received signals to digital form;

independently generating for the first and second carrier signals separate digital replicas of the P-code pseudorandom code sequence without encryption, having in-phase (I) and quadrature (Q) components;

digitally correlating each of the received first and second carrier signals containing the encrypted P-code sequence with the I and Q components of the respective locally generated replica of the P-code sequence, to obtain two resultant I and Q signals relating to the first carrier signal and two other resultant I and Q signals relating to the second carrier signal;

separately integrating the two pairs of resultant signals over the encryption time interval, to obtain I1 and Q1 signals corresponding to the received first carrier signal, and I2 and Q2 signals corresponding to the received second carrier signal;

digitally cross-correlating the resultant I1/Q1 and I2/Q2 signals, to obtain a carrier signal at a frequency equal to the difference between the frequencies of the first and second carrier signals, with a desirably high signal-to-noise ratio; and controlling the step of digitally generating the replicas of the P-code sequence, to maintain synchronism with the received P-code sequence.

13. A method as defined in claim 12, wherein:

the step of controlling the step of digitally generating the replicas of the P-code sequence includes obtaining timing information indicative of a pseudo-range pertaining to a satellite from which the first and second signals are received.

14. Apparatus for processing received signals in a global positioning system (GPS), to generate a carrier difference signal having a frequency that is the difference between first and second GPS carrier signals that have been modulated with an encrypted P-code signal, the apparatus comprising:

antenna means, for receiving first and second carrier signals transmitted from each of a plurality of satellites, the signals containing an encrypted version of a pseudorandom code sequence known as P code;

means for converting the received signals to digital form;

means for independently generating two digital replicas of the P-code pseudorandom code sequence without encryption, the replicas having in-phase (I) and quadrature (Q) components;

means for digitally correlating each of the received first and second carrier signals containing the encrypted P-code sequence with the I and Q components of the respective locally generated replicas of the P-code sequence, to obtain two resultant I and Q signals relating to the first carrier signal and two other resultant I and Q signals relating to the second carrier signal;

means for separately integrating the two pairs of resultant signals over the encryption time interval, to obtain I1 and Q1 signals corresponding to the received first carrier signal, and I2 and Q2 signals corresponding to the received second carrier signal;

means for digitally cross-correlating the resultant I1/Q1 and I2/Q2 signals, to obtain a carrier signal at a frequency equivalent to the difference in frequencies of the first and second carrier signals, with a desirably high signal-to-noise ratio; and means for controlling the step of digitally generating replicas of the P-code sequence, to maintain synchronism with the received P-code sequence.

15. A method for detecting and compensating for tracking errors in a received global positioning system (GPS) P-code signal, the method comprising the steps of:

receiving a signal transmitted from each of a plurality of satellites, the signal containing an encrypted version of a pseudorandom code sequence known as P code;

converting the received signals to digital form;

deriving a digital carrier signal having components I and Q by correlating the received signals with I and Q components of a locally generated P-code sequence;

generating a digital P-code early-late signal indicative of the relative timing of the received P-code signal, and having in-phase and quadrature components;

digitally correlating the received encrypted P-code sequence in digital form with the in-phase and quadrature components of the digital P-code early-late signal, to obtain a succession of in-phase (I) and quadrature (Q) samples from the results of the digital correlation;

integrating the I and Q samples over a time period previously determined to be the encryption time period, to obtain successive I early-late ($I_{EL}$) and Q early-late ($Q_{EL}$) values;

digitally computing the vector dot product of the P-code early-late signal, defined by $I_{EL}$ and $Q_{EL}$, and the carrier signal defined by I and Q, to obtain a P-code tracking error signal; and controlling the step of generating the P-code early-late signal, to null the P-code tracking error.

16. A method as defined in claim 15, wherein:

the step of computing the vector dot product includes computing the quantity ($I \cdot I_{EL} + Q \cdot Q_{EL}$).

17. A method as defined in claim 15, wherein:

the steps are performed with respect to a received first GPS carrier signal; and the method further includes a set of identical steps performed with respect to a received second GPS carrier signal.

18. Apparatus for detecting and compensating for tracking errors in a received global positioning system (GPS) P-code signal, the apparatus comprising:

antenna means, for receiving a signal transmitted from each of a plurality of satellites, the signal containing an encrypted version of a pseudorandom code sequence known as P code;

means for converting the received signals to digital form;

means for deriving a digital carrier signal having components I and Q by correlating the received signals with a locally generated P-code sequence;

means for generating a digital P-code early-late signal indicative of the relative timing of the received P-code signal;

means for resolving the digital P-code early-late signal into in-phase and quadrature components;

means for digitally correlating the received encrypted P-code sequence in digital form with the in-phase and quadrature components of the digital P-code early-late signal, to obtain a succession of in-phase (I) and quadrature (Q) samples from the results of the digital correlation;

means for integrating the I and Q samples over a time period previously determined to be the encryption time period, to obtain successive I early-late ($I_{EL}$) and Q early-late ($Q_{EL}$) values;

means for digitally computing the vector dot product of the P-code early-late signal, defined by $I_{EL}$ and $Q_{EL}$, and the carrier signal defined by I and Q, to obtain a P-code tracking error signal; and means for controlling the means for generating the P-code early-late signal, to null the P-code tracking error.

19. A method for detecting and compensating for tracking errors in a received global positioning system (GPS) P-code signal, the method comprising the steps of:

receiving a signal transmitted from each of a plurality of satellites, the signal containing an encrypted version of a pseudorandom code sequence known as P code and another pseudorandom code sequence known as C/A code;

deriving a carrier signal having components I and Q by correlating the received signals with a locally generated C/A code sequence;

tracking the carrier signal using a carrier tracking loop, whereby using the C/A code for carrier tracking provides an improvement in carrier signal-to-noise ratio; and controlling the timing of the C/A code with a P-code tracking loop.

20. A method for processing received signals in a global positioning system (GPS), to generate a carrier difference signal having a frequency that is the difference between first and second GPS carrier signals that have been modulated with an encrypted P-code signal, the method comprising the steps of:

receiving first and second carrier signals transmitted from each of a plurality of satellites, the signals containing an encrypted version of a pseudorandom code sequence known as P code;

converting the received signals to digital form;

independently generating for the first and second carrier signals separate digital replicas of the P-code pseudorandom code sequence without encryption, having in-phase (I) and quadrature (Q) components;

generating a replica of the C/A code sequence;

correlating the replica of the C/A code sequence with the received first carrier signal, to permit carrier tracking of the first carrier signal;

correlating the replicas of the P-code sequence with the received first and second carrier signals, respectively;

code tracking the first and second carrier signals to synchronize a selected code sequence contained in the carrier sequence with locally generated signals; and digitally cross-correlating signals obtained from correlation with the replicas of the P-code sequences, to obtain a derived carrier signal at a frequency equivalent to the difference in frequencies of the first and second carrier signals, with a desirably high signal-to-noise ratio.

21. A method as defined in claim 20, and further comprising:

carrier tracking the second carrier signal by combining the derived carrier signal obtained from the cross-correlation step and the first carrier signal obtained from carrier tracking of the first carrier signal.

22. A method for processing received signals in a global positioning system (GPS), to derive carrier signal measurements by squaring one of first and second GPS carrier signals that have been modulated with an encrypted P-code signal, the method comprising the steps of:

receiving first and second carrier signals transmitted from each of a plurality of satellites, the signals containing an encrypted version of a pseudorandom code sequence known as P code;

converting the received signals to digital form;

independently generating for the first and second carrier signals separate digital replicas of the P-code pseudorandom code sequence without encryption, having in-phase (I) and quadrature (Q) components;

generating a replica of the C/A code sequence;

correlating the replica of the C/A code sequence with the received first carrier signal, to permit carrier tracking of the first carrier signal;

correlating the replicas of the P-code sequence with the received first and second carrier signals, respectively, to provide correlated first and second carrier signals;

digitally squaring the correlated second carrier signal, to provide second carrier signal phase measurements at a relatively high signal-to-noise ratio; and digitally cross-correlating the correlated first and second carrier signals, to resolve half-cycle ambiguity in the second carrier signal phase measurements obtained by digital squaring.

23. A method for processing received signals in a global positioning system to take advantage of a benefit that arises from use of a carrier difference signal having a frequency that is equivalent to the difference between the frequencies of first and second carrier signals that have been modulated with an encrypted P-code signal, the method comprising the steps of:

locally generating two separate P-code replicas;

employing the P-code replicas to aid in code tracking of the first and second carrier signals, respectively;

locally generating a C/A code replica;

employing the C/A code replica to track the first carrier signal; and cross-correlating the first and second carrier signals to obtain a derived carrier difference signal that has a frequency equal to the difference in the frequencies of the first and second carrier signals, and has a signal-to-noise-ratio advantage over either carrier signal used separately for resolving carrier whole cycle ambiguity.

24. A method as defined in claim 23, and further comprising the step of:

employing the derived carrier difference signal to track the second carrier signal.

25. A method for processing received signals in a global positioning system to take advantage of a benefit that arises from use of a carrier difference signal having a frequency that is equivalent to the difference between the frequencies of first and second carrier signals that have been modulated with an encrypted P-code signal, the method comprising the steps of:

locally generating two separate P-code replicas;

employing the P-code replicas to aid in code tracking of the first and second carrier signals in separate tracking loops;

squaring the second carrier signal, after correlating with the P-code replica, to eliminate the effect of a P-code encryption signal and to obtain a double-frequency signal of frequency twice that of the second carrier signal, wherein the phase of the second carrier signal is derived by dividing the phase of the double-frequency signal by two;

performing a cross-correlation process on the first and second carrier signals to obtain frequency difference signal having a frequency equal to the difference in frequencies of the first and second carrier signals with all other modulation, common to the first and second carrier signals, removed; and deriving from the frequency difference signal a polarity signal from which half-cycle ambiguity of the phase measurement of the second carrier signal, as derived from the phase of the double-frequency signal divided by two, can be resolved.

26. A method as defined in claim 25, wherein:

the cross-correlation process is one of direct cross-correlation of the first and second carrier signals; and the method further comprises the steps of adjusting the delay of the first carrier signal relative to the second, prior to cross-correlation of the first and second carrier signals, using timing information derived from the separate code tracking loops for the first and second carrier signals.

27. A method as defined in claim 26, wherein the step of adjusting the delay of the first carrier signal relative to the second is effected by shifting one of the first and second carrier signals through a multi-stage shift register to provide a variable delay, and controlling the amount of the delay with timing signals from the separate code tracking loops.

28. A method as defined in claim 25, wherein:

the cross-correlation process is one of code-aided cross-correlation, wherein cross-correlation of the first and second carrier signals occurs after correlating each carrier with a corresponding one of the two P-code replicas derived from separate tracking loops, removing the P-code but leaving the common P-code encryption.

29. A method for detecting and compensating for tracking errors in received global positioning system (GPS) signals, the method comprising the steps of:

receiving a signal transmitted from each of a plurality of satellites, the signal containing a pseudorandom code sequence known as P code, which is subject to encryption, and another pseudorandom code sequence known as C/A code, the timing of which is coherent with the P code;

deriving a digital carrier signal having components I and Q by correlating the received signal with a C/A code sequence supplied by a local C/A code generator;

tracking the received carrier signal using a carrier tracking loop that includes the local C/A code generator, whereby use of the C/A code for carrier tracking provides a carrier signal with an improved signal-to-noise ratio as compared with using code aided squaring for carrier tracking when the P-code is encrypted;

tracking the received P code or encrypted P-code sequence using a tracking loop that includes a local P code generator, whereby use of P code for this purpose provides better code tracking because the P code sequence is a faster changing and more precise code with respect to the C/A code; and controlling the timing of the C/A code generator with signals derived from the P-code tracking loop.

* * * * *